US011880158B2

(12) United States Patent

Sato et al.

(10) Patent No.: US 11,880,158 B2

(45) Date of Patent: Jan. 23, 2024

(54) IMAGE FORMING APPARATUS

(71) Applicant: BROTHER KOGYO KABUSHIKI KAISHA, Nagoya (JP)

(72) Inventors: Shougo Sato, Seto (JP); Masato Makino, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/053,026

(22) Filed: Nov. 7, 2022

(65) Prior Publication Data

US 2023/0101166 A1 Mar. 30, 2023

Related U.S. Application Data

(63) Continuation of application No. 17/327,912, filed on May 24, 2021, now Pat. No. 11,526,117, which is a (Continued)

(30) Foreign Application Priority Data

Aug. 29, 2018 (JP) ................................ 2018-160694

(51) Int. Cl.
*G03G 21/00* (2006.01)
*G03G 21/10* (2006.01)
(Continued)

(52) U.S. Cl.
CPC ........... *G03G 21/105* (2013.01); *G03G 21/12* (2013.01); *G03G 21/1642* (2013.01); *G03G 21/1676* (2013.01)

(58) Field of Classification Search
CPC .. G03G 21/105; G03G 21/12; G03G 21/1642; G03G 21/1676
(Continued)

(56) References Cited

U.S. PATENT DOCUMENTS 6,055,406 A 4/2000 Kawai et al.
8,805,266 B2 8/2014 Sato
(Continued)

FOREIGN PATENT DOCUMENTS

JP 10-307519 A 11/1998
JP 2007-178608 A 7/2007
(Continued)

OTHER PUBLICATIONS

Office Action (Notice of Reasons for Refusal) issued in corresponding Japanese Patent Application No. 2018-160694, dated Apr. 26, 2022.

*Primary Examiner* — Hoan H Tran

(74) *Attorney, Agent, or Firm* — Merchant & Gould, P.C.

(57) ABSTRACT

A drawer is moveable between an inner position and an outer position through an opening when a cover is located at an opening position. A waste toner conveying tube is movable in a second direction between a first connection position and a first disconnection position when a drum cartridge is attached to a drawer and the drawer is at the inner position. When the cover moves from a closing position toward the opening position, the waste toner conveying tube moves from the first connection position toward the first disconnection position in conjunction with the movement of the cover. The drawer is movable from the inner position toward to the outer position when the drum cartridge is attached to the drawer, the drawer is at the inner position, and the waste toner conveying tube is at the first disconnection position.

12 Claims, 15 Drawing Sheets

Related U.S. Application Data continuation of application No. 16/845,243, filed on Apr. 10, 2020, now Pat. No. 11,029,635, which is a continuation of application No. 16/540,817, filed on Aug. 14, 2019, now Pat. No. 10,649,392.

(51) Int. Cl.
*G03G 21/12* (2006.01)
*G03G 21/16* (2006.01)

(58) Field of Classification Search
USPC .......................................................... 399/358
See application file for complete search history.

(56) References Cited

U.S. PATENT DOCUMENTS

| | | | |
|---|---|---|---|
| 10,649,392 | B2 | 5/2020 | Sato |
| 10,691,059 | B2 | 6/2020 | Sato |
| 2007/0146739 | A1 | 6/2007 | Igarashi |
| 2010/0247137 | A1 | 9/2010 | Akaike et al. |
| 2013/0028631 | A1 | 1/2013 | Sato |
| 2013/0028632 | A1 | 1/2013 | Sato et al. |
| 2014/0376963 | A1 | 12/2014 | Suzuki |
| 2015/0147088 | A1 | 5/2015 | Sato et al. |
| 2016/0291527 | A1 | 10/2016 | Hashimoto et al. |

FOREIGN PATENT DOCUMENTS

| | | | |
|---|---|---|---|
| JP | 2008176163 | * | 7/2008 |
| JP | 2010-164632 | A | 7/2010 |
| JP | 2010-231114 | A | 10/2010 |
| JP | 2013-29755 | A | 2/2013 |
| JP | 2013-29756 | A | 2/2013 |
| JP | 2014-48510 | A | 3/2014 |
| JP | 2015-4931 | A | 1/2015 |
| JP | 2015-102721 | A | 6/2015 |
| JP | 2016-173471 | A | 9/2016 |
| JP | 2016-194584 | A | 11/2016 |
| JP | 2017-44727 | A | 3/2017 |
| JP | 2018054711 | * | 4/2018 |

* cited by examiner

IMAGE FORMING APPARATUS

CROSS-REFERENCE TO RELATED APPLICATION

This application is a continuation of U.S. patent application Ser. No. 17/327,912, filed May 24, 2021, which is a continuation of U.S. patent application Ser. No. 16/845,243 filed Apr. 10, 2020, now U.S. Pat. No. 11,029,635, which is a continuation of U.S. patent application Ser. No. 16/540,817, filed Aug. 14, 2019, now U.S. Pat. No. 10,649,392, which claims priority from Japanese Patent Application No. 2018-160694 filed on Aug. 29, 2018. The entire subject-matter of the aforementioned applications are incorporated herein by reference.

TECHNICAL FIELD

The present disclosure relates to an image forming apparatus.

BACKGROUND

An image forming apparatus including a main body housing, a cover, a drawer, a drum cartridge, a toner container, and a toner conveying tube has been known. The main body housing has an opening. The cover is movable between an opening position at which the opening is opened and a closing position at which the opening is closed. The drawer is movable in a first direction between an inner position located inside the main body housing and an outer position located outside the main body housing through the opening when the cover is located at the opening position. The drum cartridge includes a photosensitive drum. The toner container accommodates toner to be supplied to the drum cartridge. The toner conveying tube is used to convey the toner from the toner container to the drum cartridge. The toner conveying tube is movable in a second direction intersecting with the first direction between a connection position at which the toner conveying tube is connected to the drum cartridge and a disconnection position at which the toner conveying tube is disconnected from drum cartridge (refer to JP-A-2013-029755).

SUMMARY

In the image forming apparatus explained above, it is needed to remove and collect waste toner from the peripheral surface of the photosensitive drum.

In this case, it is required that the drawer is movable between the inner position and the outer position, and the waste toner should be conveyed from the drum cartridge to a waste toner container.

An object of the present disclosure is to provide an image forming apparatus capable of conveying waste toner from a drum cartridge to a waste toner container while enabling a drawer to move between an inner position and an outer position.

An image forming apparatus according to the present disclosure includes:

a main body housing having an opening;

a cover movable between an opening position at which the opening is opened and a closing position at which the opening is closed;

a drawer movable in a first direction through the opening between an inner position at which the drawer is located inside the main body housing and an outer position at which the drawer is located outside the main body housing;

a drum cartridge attachable to and detachable from the drawer, the drum cartridge including a photosensitive drum and a drum cleaner for removing waste toner from a peripheral surface of the photosensitive drum;

a waste toner container for accommodating waste toner removed from the peripheral surface of the photosensitive drum by the drum cleaner; and a waste toner conveying tube for conveying the waste toner, in which, when the drum cartridge is attached to the drawer and the drawer is at the inner position, the waste toner is conveyed from the drum cartridge to the waste toner container through the waste toner conveying tube, in which, when the drum cartridge is attached to the drawer and the drawer is at the inner position, the waste toner conveying tube is movable in a second direction intersecting with the first direction between a first connection position at which the waste toner conveying tube is connected to the drum cartridge and a first disconnection position at which the waste toner conveying tube and the drum cartridge are disconnected, in which, when the drum cartridge is attached to the drawer and the waste toner conveying tube is at the first disconnection position, the drawer is movable from the inner position to the outer position, in which, when the drum cartridge is attached to the drawer, the drawer is at the inner position, and the waste toner conveying tube is at the first connection position, the drawer is not movable from the inner position to the outer position, and in which when the cover moves from the closing position toward the opening position, the waste toner conveying tube moves from the first connection position toward the first disconnection position in conjunction with the movement of the cover.

When the cover moves from the closing position to the opening position, the waste toner conveying tube moves from the first connection position to the first disconnection position in conjunction with the movement of the cover.

According to the above configuration of the image forming apparatus, the waste toner can be conveyed from the drum cartridge to the waste toner container through the waste toner conveying tube.

When a user moves the cover from the closing position to the opening position, the waste toner conveying tube and the drum cartridge are disconnected to move the drawer between the inner position and the outer position.

Therefore, in the image forming apparatus, the waste toner can be conveyed from the drum cartridge to the waste toner container while the drawer is movable between the inner position and the outer position.

The waste toner conveying tube has a waste toner discharge opening through which the waste toner is discharged, and the waste toner discharge opening is located inside the waste toner container both in a case where the waste toner conveying tube is located at the first connection position and in a case the waste toner conveying tube is located at the first disconnection position.

The waste toner container is attachable to and detachable from the main body housing along the second direction.

The image forming apparatus further includes:

a shutter movable in the second direction between a closing position at which the waste toner discharge opening is closed and an opening position at which the waste toner discharge opening is opened, in which, when the waste toner container is being attached to the image forming apparatus, the shutter is in contact with the waste toner container and the shutter is moved from the closing position toward the opening position, in which, when the waste toner container is being detached from the image forming apparatus, the shutter is in contact with the waste toner container and the shutter is moved from the opening position toward the closing position, and in which the waste toner conveying tube is movable between the first connection position and the first disconnection position when the waste toner container is attached to the image forming apparatus and the shutter is located at the opening position.

The image forming apparatus further includes:

a second drum cartridge attachable to and detachable from the drawer, the second drum cartridge including a second photosensitive drum and a second drum cleaner for removing waste toner from a peripheral surface of the second photosensitive drum; and a second waste toner conveying tube through that the waste toner is conveyed from the second drum cartridge to the waste toner container, in which, when the drum cartridge and the second drum cartridge are attached to the drawer, the second drum cartridge is arranged in alignment with the drum cartridge in the first direction, and in which, when the waste toner container is attached to the image forming apparatus, the waste toner conveying tube and the second waste toner conveying tube are connected to the waste toner container.

The image forming apparatus further includes:

a main body coupling for transmitting power from the image forming apparatus to the drum cartridge in a state where the drum cartridge is attached to the drawer and the drawer is located at the inner position, in which the main body coupling is located at an opposite side to the waste toner conveying tube with respect to the drum cartridge in the second direction.

The drum cartridge includes:

a first drum coupling coupled to the main body coupling when the drawer supporting the drum cartridge is located at the inner position, the first drum coupling is rotatable together with the main body coupling when the first drum coupling is coupled to the main body coupling, and the first drum coupling is located on one outer surface of the drum cartridge in the second direction; and a second drum coupling rotatable by power from the first drum coupling, the second drum coupling located on the other outer surface of the drum cartridge in the second direction, and in which the waste toner conveying tube includes a conveying tube coupling coupled to the second drum coupling when the drawer supporting the drum cartridge is located at the inner position, the conveying tube coupling rotatable together with the second drum coupling when the conveying tube coupling is coupled to the second drum coupling.

The image forming apparatus further includes:

a circuit board located at an opposite side to the main body coupling with respect to the drum cartridge in the second direction.

The image forming apparatus further includes:

a second circuit board located at an opposite side to the main body coupling with respect to the drum cartridge in the second direction, and the second circuit board located with being spaced from the circuit board in a third direction intersecting with both the first direction and the second direction, in which the waste toner conveying tube is located between the circuit board and the second circuit board in the third direction.

The image forming apparatus further includes:

a toner container for accommodating toner; and a toner conveying tube for conveying toner, in which, when the drum cartridge is attached to the drawer and the drawer is at the inner position, the toner conveying tube is movable in the second direction between a second connection position at which the toner conveying tube is connected to the drum cartridge and a second disconnection position at which the toner conveying tube and the drum cartridge are disconnected, in which, when the drum cartridge is attached to the drawer and the drawer is at the inner position, and the toner conveying tube is at the second connection position, the toner conveying tube is configured to convey toner from the toner container to the drum cartridge, and in which the toner conveying tube is located at an opposite side to the waste toner conveying tube with respect to the drum cartridge in the second direction.

The toner container includes:

a housing that accommodates toner and has a toner discharge opening through which the toner is discharged;

a first shutter locating on an outer surface of the toner container, the first shutter movable between a first closing position at which the toner discharge opening is closed and a first opening position at which the toner discharge opening is opened; and a second shutter located inside the housing, the second shutter rotatable about an axis extending in the second direction between a second closing position at which the toner discharge opening is closed and a second opening position at which the toner discharge opening is opened.

The toner container is attachable to and detachable from the image forming apparatus along the second direction.

The image forming apparatus further includes:

a cam including a first pressing part that presses the waste toner conveying tube from the first connection position toward the first disconnection position when the cover moves from the closing position toward the opening position, and a second pressing part that presses the toner conveying tube from the second connection position toward the second disconnection position when the cover moves from the closing position toward the opening position.

The image forming apparatus further includes:

a guide for guiding the drawer, the guide movable through the opening between an accommodation position at which the guide is accommodated inside the main body housing and a protruding position at which the guide protrudes to an outside of the main body housing, in which the guide moves from the accommodation position toward the protruding position in conjunction with the movement of the cover when the cover moves from the closing position toward the opening position.

The second direction is a direction in which an axis of the photosensitive drum extends.

According to the image forming apparatus of the present disclosure, it is possible to convey the waste toner from the drum cartridge to the waste toner container while the drawer is enabled to move between the inner position and the outer position.

DETAILED DESCRIPTION

1. Outline of Image Forming Apparatus

An outline of an image forming apparatus 1 is described with reference to FIGS. 1 to 4.

Figure 1:
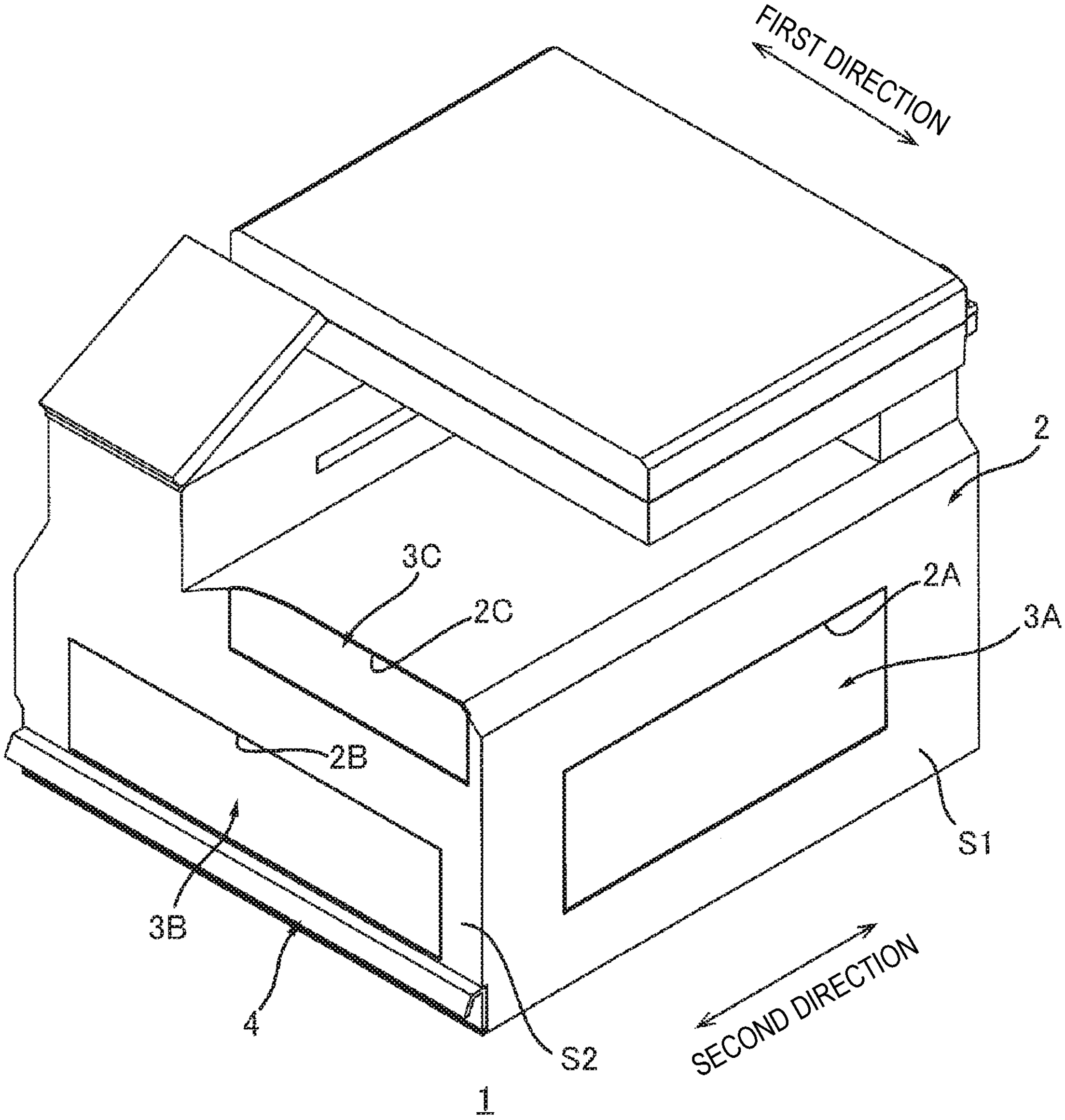
FIG. 1 is a view depicting an outer appearance of an image forming apparatus.
Figure 2:
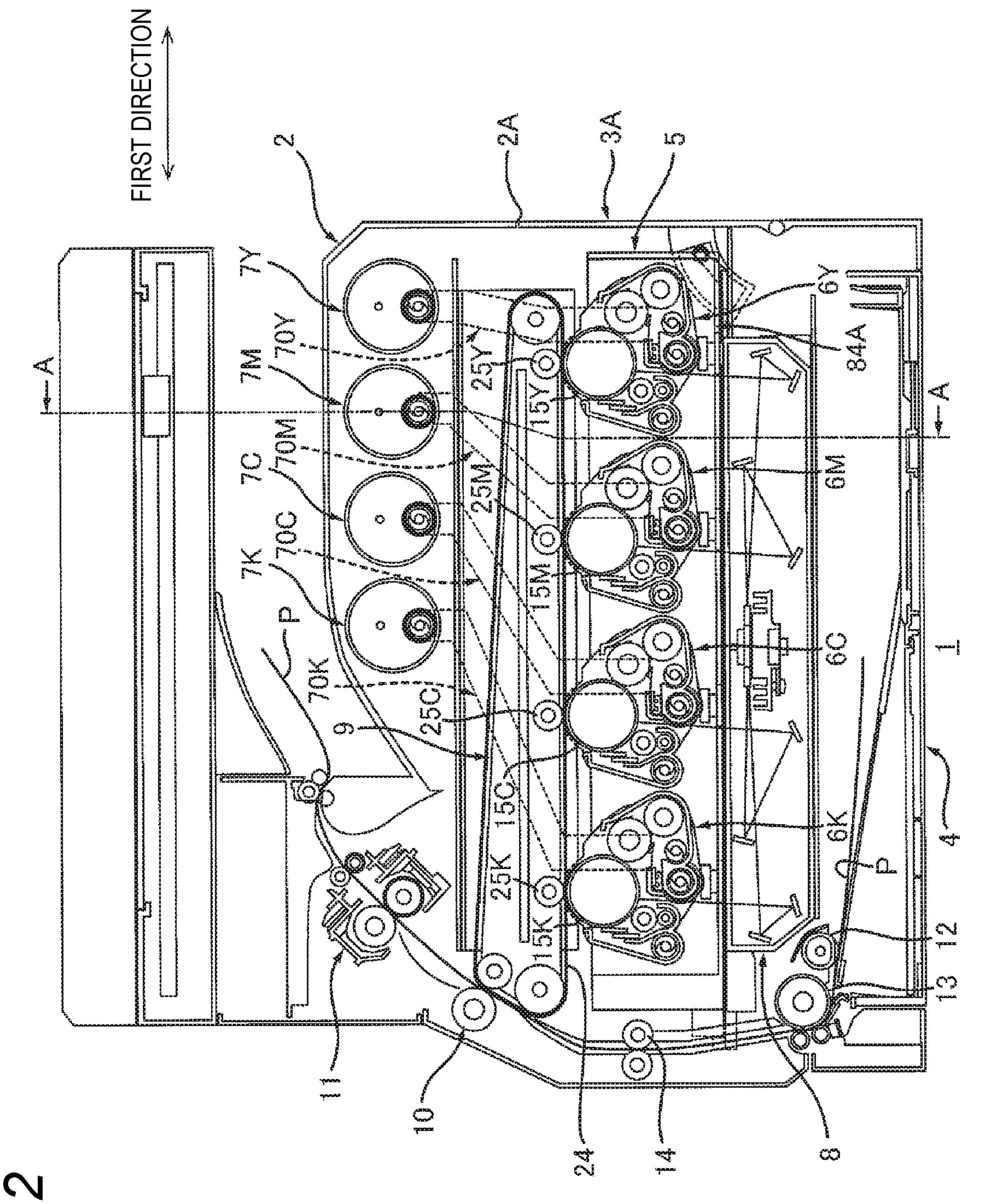
FIG. 2 is a view illustrating an outline of the image forming apparatus shown in FIG. 1.

As shown in FIG. 1 or 2, the image forming apparatus 1 includes a main body housing 2, a cover 3A, a second cover 3B, a third cover 3C, a feeder cassette 4, a drawer 5, four drum cartridges 6Y, 6M, 6C, 6K, four toner containers 7Y, 7M, 7C, 7K, an exposure device 8, an intermediate transfer device 9, a secondary transfer roller 10, and a fixing device 11.

1.1 Main Body Housing and Cover

As shown in FIG. 2, the main body housing 2 accommodates the feeder cassette 4, the drawer 5, the four drum cartridges 6Y, 6M, 6C, 6K, the four toner containers 7Y, 7M, 7C, 7K, the exposure device 8, the intermediate transfer device 9, the secondary transfer roller 10 and the fixing device 11.

As shown in FIG. 1, the main body housing 2 has an opening 2A, a second opening 2B, and a third opening 2C. The opening 2A is located on one outer surface S1 of the main body housing 2 in a first direction. The second opening 2B is located on one outer surface S2 of the main body housing 2 in a second direction. The third opening 2C is located on one outer surface S2 of the main body housing 2 in the second direction. Also, the third opening 2C is located above the second opening 2B.

In the meantime, the first direction is a moving direction of the drawer 5. The second direction is a direction in which an axis A1 of a photosensitive drum 15Y extends. The drawer 5 and the photosensitive drum 15Y will be described later. The second direction intersects with the first direction. Preferably, the second direction is perpendicular to the first direction.

The cover 3A is movable between an opening position (refer to FIG. 3) and a closing position (refer to FIG. 2). When the cover 3A is located at the opening position, the opening 2A is opened. When the cover 3A is located at the closing position, the cover 3A closes the opening 2A.

Figure 8:
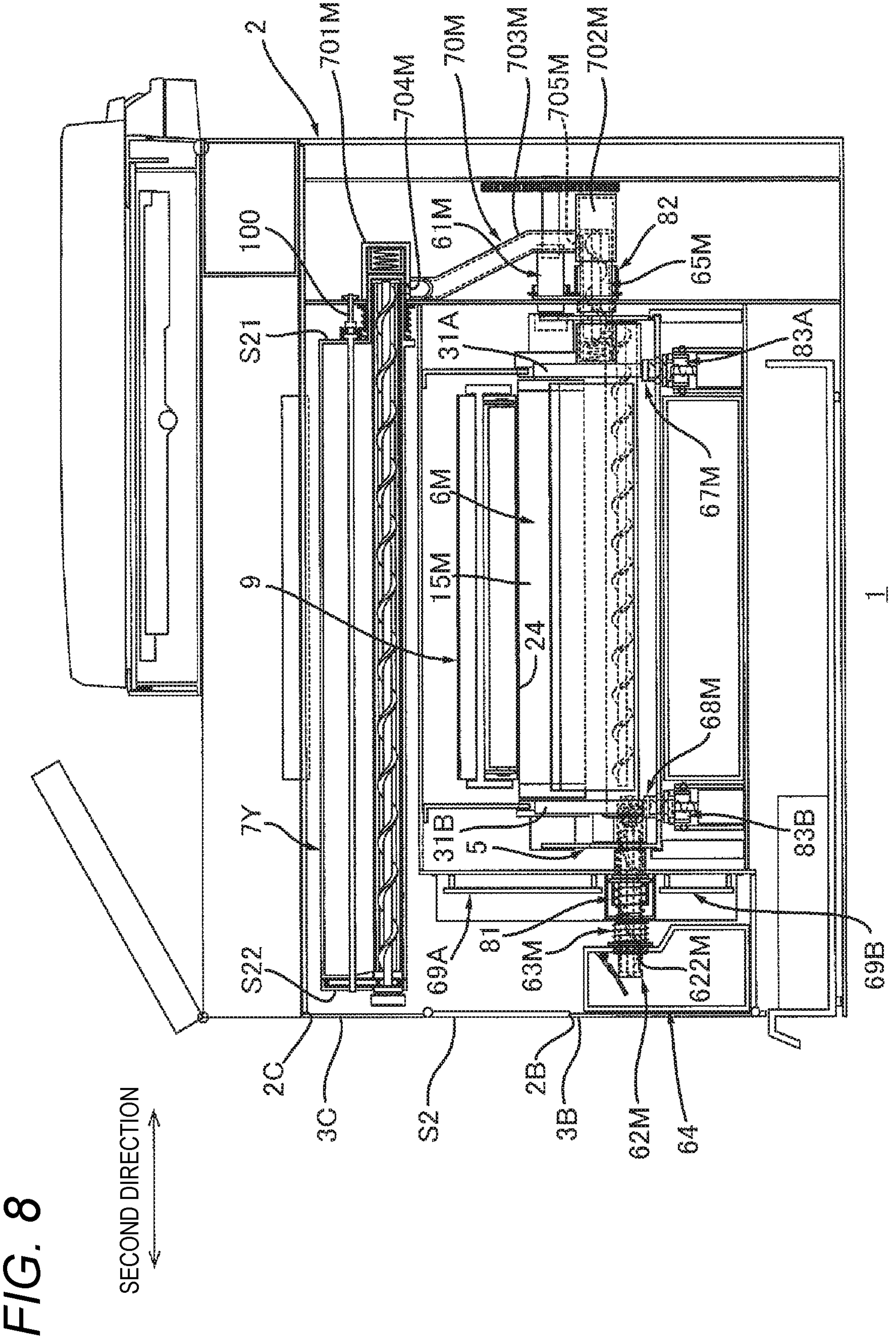
FIG. 8 is a sectional view of the image forming apparatus taken along a line A-A of FIG. 2.

The second cover 3B is movable between an opening position (refer to FIG. 12) and a closing position (refer to FIG. 8). When the second cover 3B is located at the opening position, the second opening 2B is opened. When the second cover 3B is located at the closing position, the second cover 3B closes the second opening 2B.

The third cover 3C is movable between the opening position (refer to FIG. 12) and the closing position (refer to FIG. 8). When the third cover 3C is located at the opening position, the third opening 2C is opened. When the third cover 3C is located at the closing position, the third cover 3C closes the third opening 2C.

1.2 Feeder Cassette

As shown in FIG. 2, the feeder cassette 4 enables to accommodate a printing sheet P. The printing sheet P in the feeder cassette 4 is conveyed toward the secondary transfer roller 10 by a pickup roller 12, a feeder roller 13 and conveyor rollers 14.

1.3 Drawer

Figure 3:
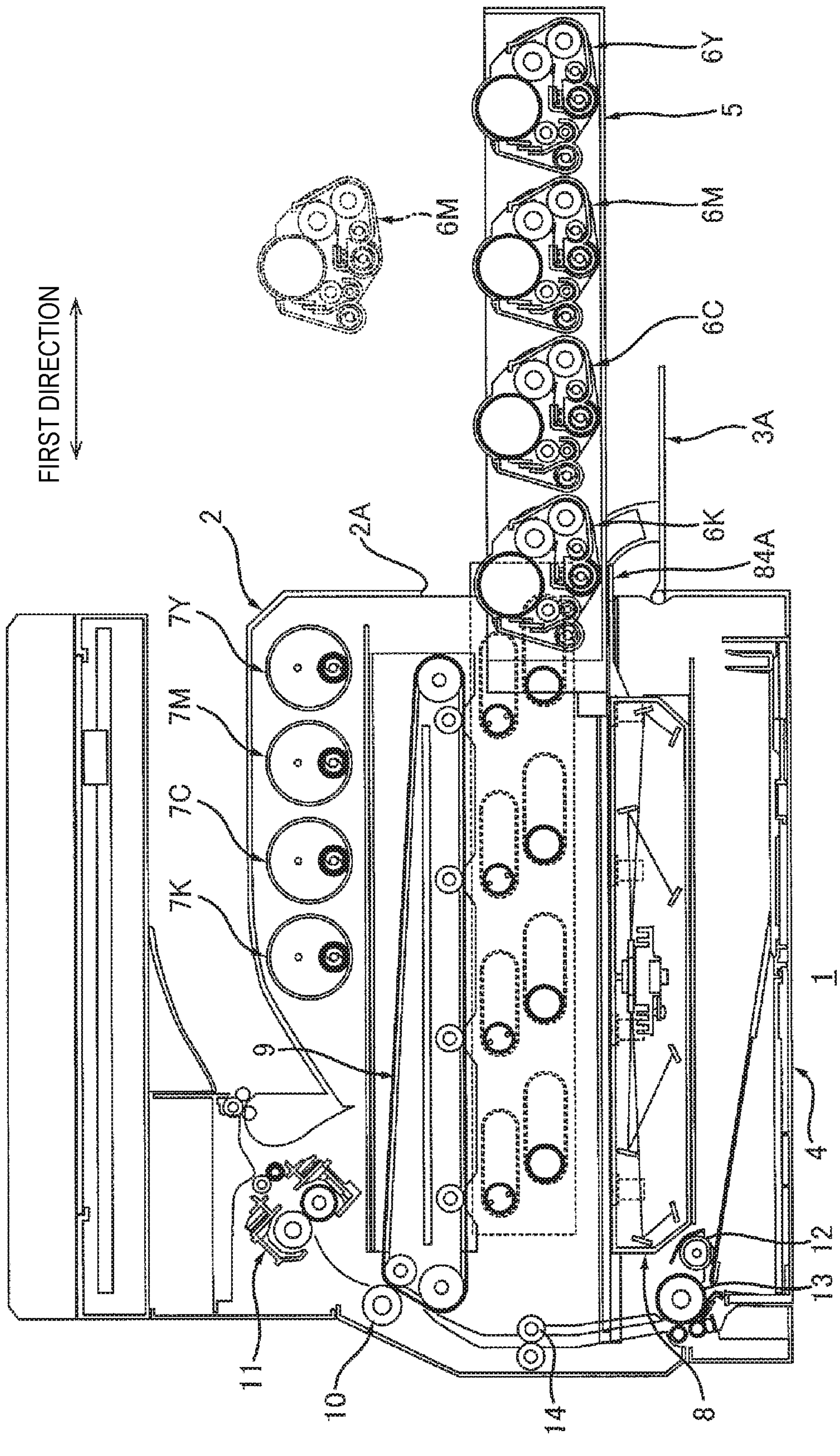
FIG. 3 is a view depicting a state where a drawer shown in FIG. 2 is located at an outer position.

As shown in FIGS. 2 and 3, the drawer 5 is movable in the first direction between an inner position (refer to FIG. 2) and an outer position (refer to FIG. 3) through the opening 2A when the cover 3A is located at the opening position. When the drawer 5 is located at the inner position, the drawer 5 is located inside the main body housing 2. When the drawer 5 is located at the inner position, the drawer 5 is located above the feeder cassette 4. When the drawer 5 is located at the outer position, the drawer 5 is located outside the main body housing 2.

1.4 Drum Cartridge

As shown in FIG. 2, each of the four drum cartridges 6Y, 6M, 6C, 6K is attachable to and detachable from the drawer 5. When the four drum cartridges 6Y, 6M, 6C, 6K are attached to the drawer 5, they are aligned side by side in the first direction. That is, the drum cartridge 6Y is arranged in alignment with the drum cartridge 6M in the first direction when the drum cartridge 6Y and the drum cartridge 6M are attached to the drawer 5.

Figure 4:
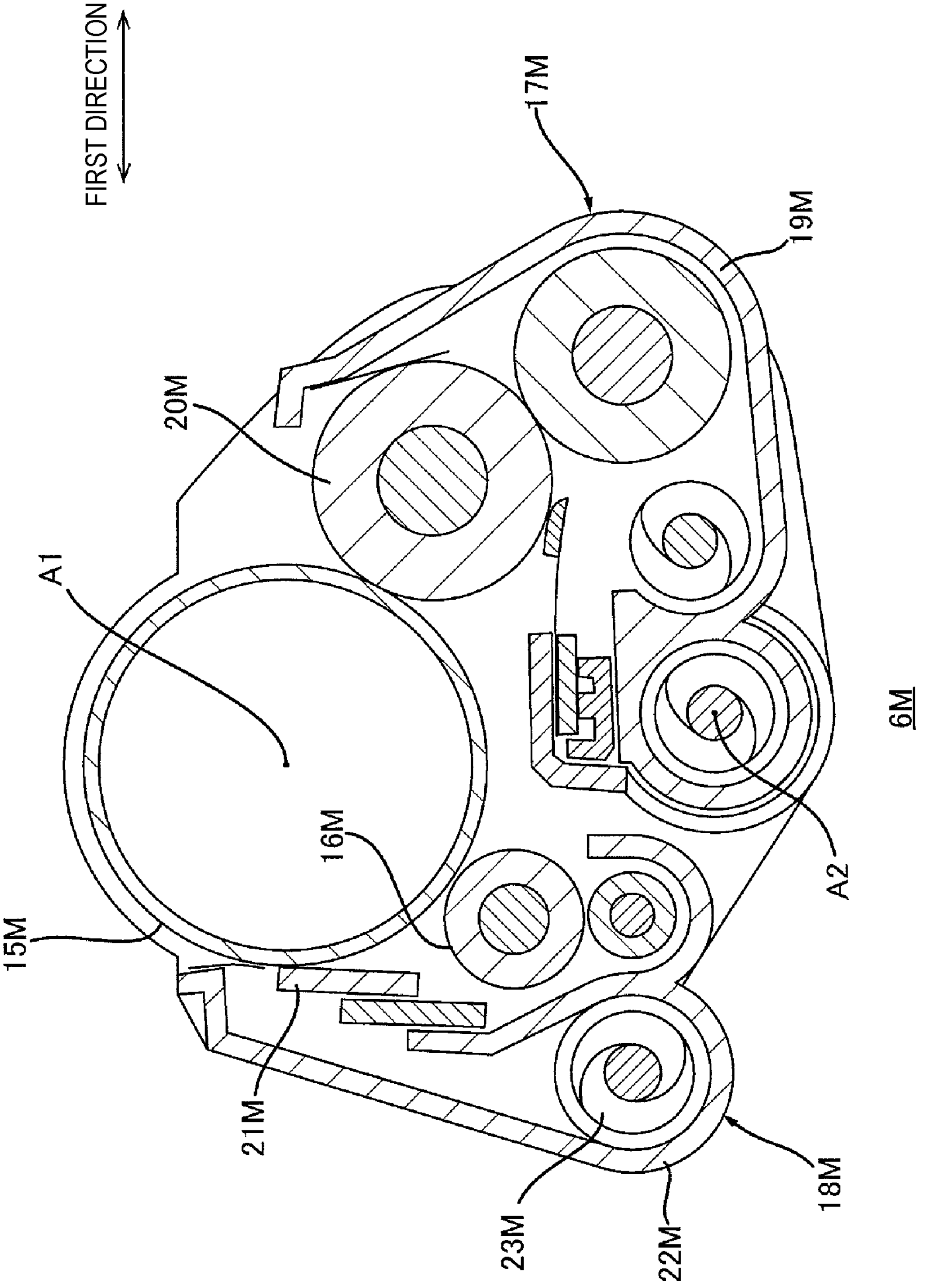
FIG. 4 is an enlarged view of a drum cartridge shown in FIG. 2.

As shown in FIG. 4, the drum cartridge 6M includes a photosensitive drum 15M, a charging roller 16M, a developing device 17M, and a drum cleaner 18M.

The photosensitive drum 15M is rotatable about the axis A1 extending in the second direction. The photosensitive drum 15M extends in the second direction. The photosensitive drum 15M has a cylindrical shape.

The charging roller 16M charges a peripheral surface of the photosensitive drum 15M. In the meantime, the drum cartridge 6M may include a scrotron-type charger, instead of the charging roller 16M.

The developing device 17M supplies toner to the peripheral surface of the photosensitive drum 15M. The developing device 17M is swingable about a swing axis A2 extending in the second direction. The developing device 17M includes a developing housing 19M and a developing roller 20M.

The developing housing 19M accommodates toner.

The developing roller 20M is supported to the developing housing 19M. The developing roller 20M is rotatable about an axis extending in the second direction. The developing roller 20M is in contact with the photosensitive drum 15M. Thereby, the developing roller 20M enables to supply the toner in the developing housing 19M to a surface of the photosensitive drum 15M.

The drum cleaner 18M cleans the peripheral surface of the photosensitive drum 15M. The drum cleaner 18M includes a cleaning blade 21M, a cleaner housing 22M, and an auger screw 23M.

The cleaning blade 21M has a flat plate shape. The cleaning blade 21M extends in the second direction. An edge of the cleaning blade 21M is in contact with the peripheral surface of the photosensitive drum 15M. The cleaning blade 21M scrapes the toner remaining on the peripheral surface of the photosensitive drum 15M from the peripheral surface of the photosensitive drum 15M when the photosensitive drum 15M is rotated. Thereby, the peripheral surface of the photosensitive drum 15M is cleaned. The toner scraped from the peripheral surface of the photosensitive drum 15M by the cleaning blade 21M is defined as 'waste toner'.

The cleaner housing 22M supports the cleaning blade 21M. The cleaner housing 22M accommodates the waste toner.

The auger screw 23M is located inside the cleaner housing 22M. The auger screw 23M conveys the waste toner in the cleaner housing 22M in the second direction.

In the meantime, as shown in FIG. 2, the drum cartridges 6Y, 6C, 6K have the same structure as the drum cartridge 6M. That is, the drum cartridge 6Y includes a photosensitive drum 15Y and a drum cleaner 18Y. The drum cleaner 18Y cleans a peripheral surface of the photosensitive drum 15Y.

1.5 Toner Container

As shown in FIG. 2, the four toner containers 7Y, 7M, 7C, 7K is attachable to and detachable from the image forming apparatus 1 along the second direction through the third opening 2C (refer to FIG. 12) when the third cover 3C is located at the opening position. The toner container 7Y accommodates the toner that is to be supplied to the developing device 17Y of the drum cartridge 6Y. The toner container 7M accommodates the toner that is to be supplied to the developing device 17M of the drum cartridge 6M. The toner container 7C accommodates the toner that is to be supplied to the developing device 17C of the drum cartridge 6C. The toner container 7K accommodates the toner that is to be supplied to the developing device 17K of the drum cartridge 6K.

1.6 Intermediate Transfer Device

The intermediate transfer device 9 is located above the four drum cartridges 6Y, 6M, 6C, 6K when the four drum cartridges 6Y, 6M, 6C, 6K are attached to the drawer 5 and the drawer 5 is located at the inner position. The intermediate transfer device 9 includes an intermediate transfer belt 24 and four primary transfer rollers 25Y, 25M, 25C, 25K.

The intermediate transfer belt 24 is in contact with the four photosensitive drum 15Y, 15M, 15C, 15K when the four drum cartridges 6Y, 6M, 6C, 6K are attached to the drawer 5 and the drawer 5 is located at the inner position.

The primary transfer roller 25Y transfers a toner image on the photosensitive drum 15Y to the intermediate transfer belt 24. The primary transfer roller 25M transfers a toner image on the photosensitive drum 15M to the intermediate transfer belt 24. The primary transfer roller 25C transfers a toner image on the photosensitive drum 15C to the intermediate transfer belt 24. The primary transfer roller 25K transfers a toner image on the photosensitive drum 15K to the intermediate transfer belt 24.

1.7 Secondary Transfer Roller

The secondary transfer roller 10 transfers the toner images transferred to the intermediate transfer belt 24 to the printing sheet P. The printing sheet P fed from the feeder cassette 4 passes between the secondary transfer roller 10 and the intermediate transfer belt 24 and is then conveyed to the fixing device 11. At this time, the secondary transfer roller 10 transfers the toner images on the intermediate transfer belt 24 to the printing sheet P.

1.8 Fixing Device

The fixing device 11 heats and presses the printing sheet P having the toner images transferred thereon to fix the toner images on the printing sheet P. The printing sheet P having passed through the fixing device 11 is discharged on an upper surface of the main body housing 2.

2. Details of Drum Cartridge

The drum cartridge 6M is described in detail with reference to FIGS. 5A to 6B. In the meantime, the drum cartridges 6Y, 6C, 6K have the same structure as the drum cartridge 6M, respectively. Therefore, in the below, the descriptions of the drum cartridges 6Y, 6C, 6K are omitted.

Figure 5A:
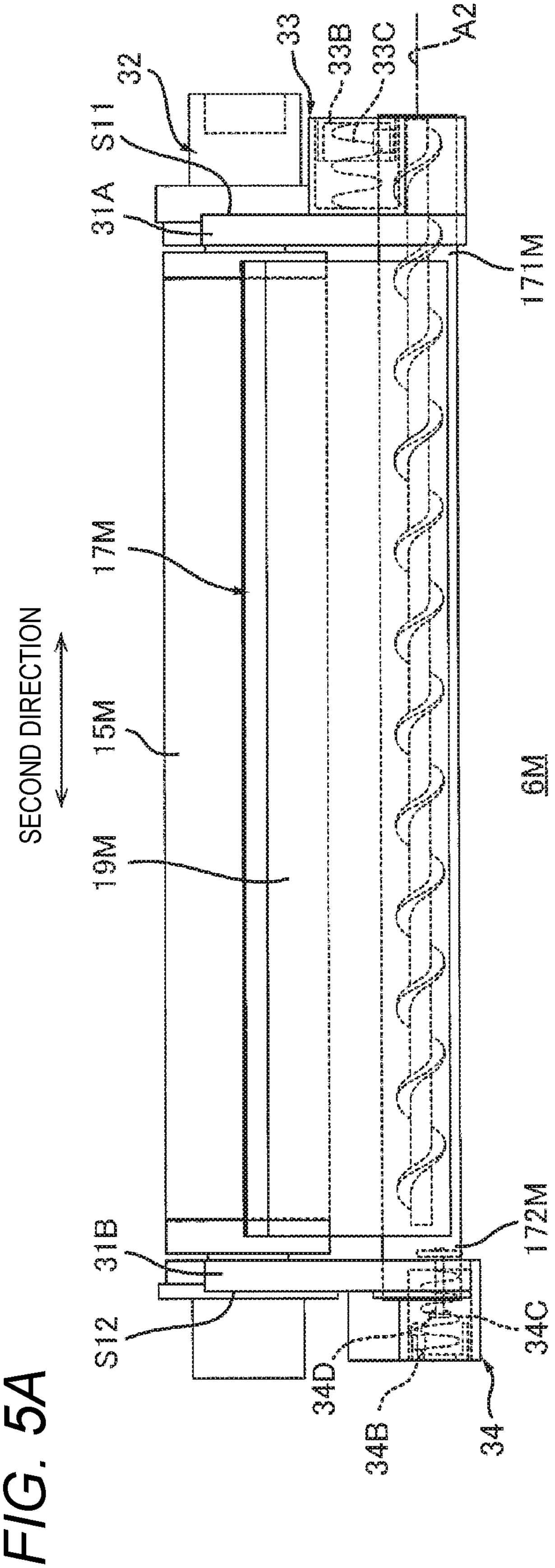
FIG. 5A is a side view of the drum cartridge shown in FIG. 4, as seen from a first direction.
Figure 5B:
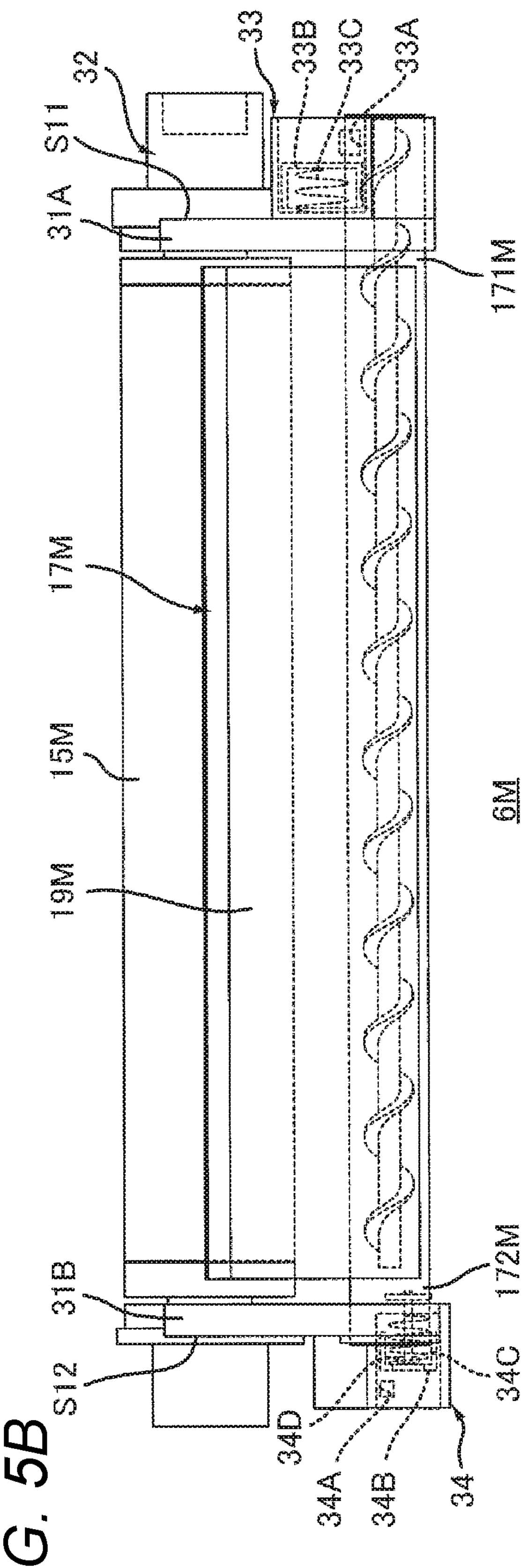
FIG. 5B depicts the drum cartridge shown in FIG. 5A in which a shutter of a first connection part is located at an opening position and a shutter of a second connection part is also located at the opening position.

As shown in FIG. 5A, the drum cartridge 6M includes a first side plate 31A, a second side plate 31B, a first drum coupling 32, a first connection part 33 to which a toner conveying tube 65M (refer to FIG. 8) is connected, and a second connection part 34 to which a waste toner conveying tube 62M (refer to FIG. 8) is connected, in addition to the photosensitive drum 15M, the charging roller 16M (refer to FIG. 4), the developing device 17M and the drum cleaner 18M (refer to FIG. 4). The toner conveying tube 65M and the waste toner conveying tube 62M will be described later.

2.1 Drum Side Plate

Figure 6A:
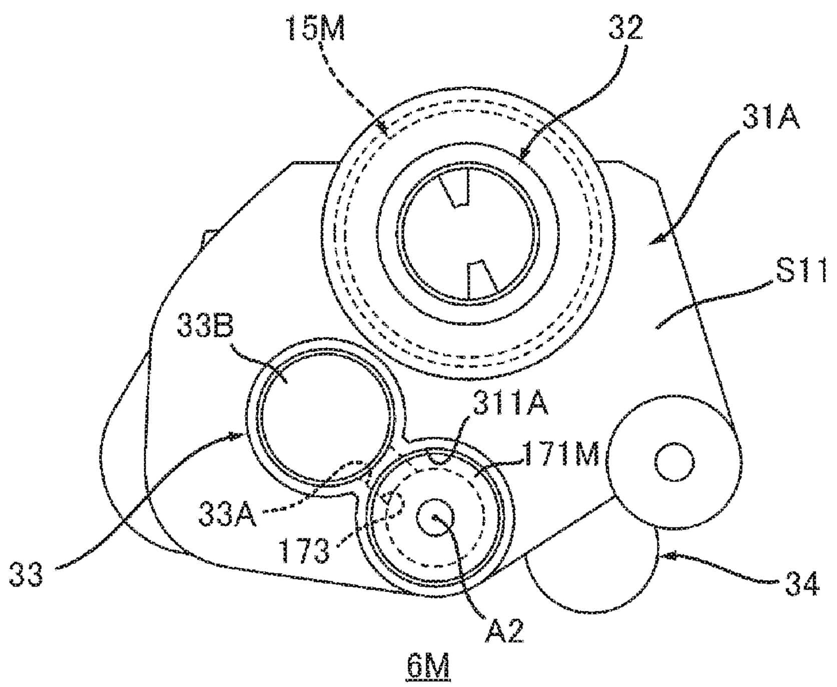
FIG. 6A is a side view of the drum cartridge shown in FIG. 5A, as seen from one side of a second direction.

As shown in FIGS. 5A and 6A, the first side plate 31A is located at one end portion of the drum cartridge 6M in the second direction. The first side plate 31A has one outer surface S11 of the drum cartridge 6M in the second direction. The first side plate 31A supports one end portion of the photosensitive drum 15M in the second direction. Also, the first side plate 31A supports one end portion of the developing device 17M in the second direction. Specifically, as shown in FIG. 5A, the developing device 17M has a protrusion 171M and a protrusion 172M. The protrusion 171M extends from one end portion of the developing housing 19M in the second direction. The protrusion 171M extends along the swing axis A2. The protrusion 171M has a cylindrical shape. The protrusion 172M is located at an opposite side to the protrusion 171M with respect to the developing housing 19M in the second direction. The protrusion 172M extends from the other end portion of the developing housing 19M in the second direction. The protrusion 172M extends along the swing axis A2. The protrusion 172M has a cylindrical shape. The first side plate 31A has a through-hole 311A, as shown in FIG. 6A. The through-hole 311A has a circular shape. The protrusion 171M is fitted in the through-hole 311A. The protrusion 171M is rotatable with respect to the first side plate 31A.

Figure 6B:
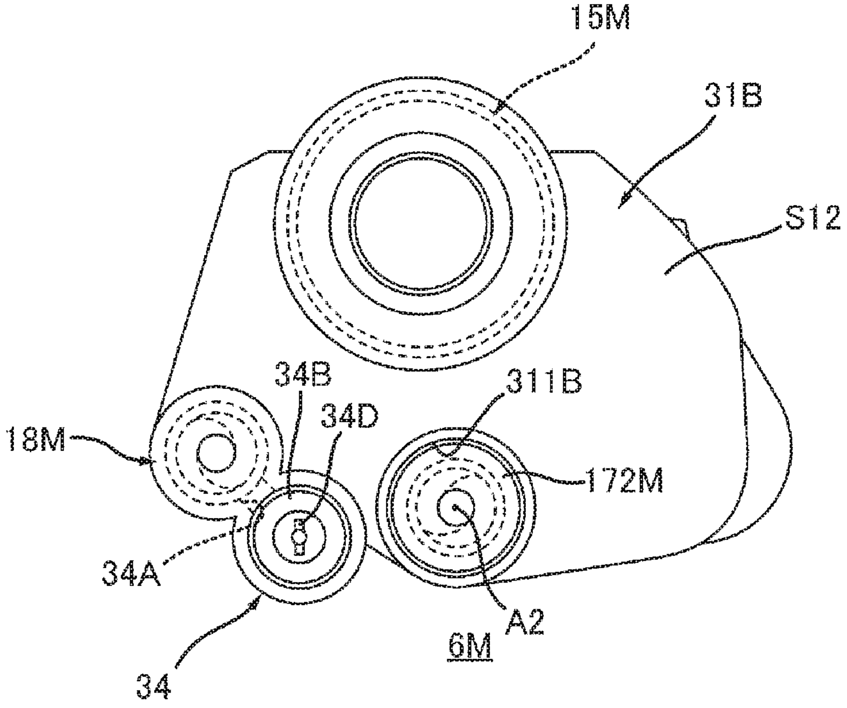
FIG. 6B is a side view of the drum cartridge shown in FIG. 5A, as seen from the other side of in the second direction.

As shown in FIGS. 5A and 6B, the second side plate 31B is located at the other end portion of the drum cartridge 6M in the second direction. The second side plate 31B is located distant from the first side plate 31A in the second direction. The second side plate 31B has the other outer surface S12 of the drum cartridge 6M in the second direction. The outer surface S12 is located distant from the outer surface S11 in the second direction. The second side plate 31B supports the other end portion of the photosensitive drum 15M in the second direction. Also, the second side plate 31B supports the other end portion of the developing device 17M in the second direction. The second side plate 31B has a through-hole 311B, as shown in FIG. 6B. The through-hole 311B has a circular shape. The protrusion 172M is fitted in the through-hole 311B. The protrusion 172M is rotatable with respect to the second side plate 31B. The protrusion 171M is fitted in the through-hole 311A, the protrusion 172M is fitted in the through-hole 311B, the protrusion 171M is rotatable with respect to the first side plate 31A and the protrusion 172M is rotatable with respect to the second side plate 31B, so that the developing device 17M enables to swing with respect to the swing axis 2.2 First Drum Coupling As shown in FIGS. 5A and 6A, the first drum coupling 32 is located on one outer surface S11 of the drum cartridge 6M in the second direction. Specifically, the first drum coupling 32 is located at one end portion of the photosensitive drum 15M in the second direction. The first drum coupling 32 is supported to the first side plate 31A. The first drum coupling 32 is rotatable together with the photosensitive drum 15M. When the drum cartridge 6M is attached to the drawer 5 and the drawer 5 is located at the inner position, the first drum coupling 32 is coupled to the main body coupling 61M (refer to FIG. 8). The first drum coupling 32 is rotatable together with the main body coupling 61M when the first drum coupling 32 is coupled to the main body coupling 61M.

2.3 First Connection Part

As shown in FIGS. 5A and 6A, the first connection part 33 is located on one outer surface S11 of the drum cartridge 6M in the second direction. The first connection part 33 extends from the first side plate 31A. The first connection part 33 extends in the second direction. The first connection part 33 has a cylindrical shape. The first connection part 33 connects with the protrusion 171M of the developing device 17M. Specifically, the first connection part 33 has a through-hole 33A. The through-hole 33A connects with a receiving opening 173 of the protrusion 171M. Also, the through-hole 33A connects with a toner discharge opening 652M (refer to FIG. 13) of the toner conveying tube 65M when the toner conveying tube 65M is connected to the first connection part 33. Thereby, the toner in the toner conveying tube 65M enters the protrusion 171M of the developing device 17M through the toner discharge opening 652M, the through-hole 33A and the receiving opening 173. Also, the first connection part 33 has a shutter 33B and a spring 33C.

The shutter 33B is movable in the second direction between a closing position (refer to FIG. 5A) at which the through-hole 33A is closed and an opening position (refer to FIG. 5B) at which the through-hole 33A is opened.

The spring 33C is provided to press the shutter 33B located at the opening position toward the closing position. When the toner conveying tube 65M is connected to the first connection part 33, the shutter 33B is pressed by the toner conveying tube 65M and is thus moved from the closing position to the opening position, against a pressing force of the spring 33C. Also, when the toner conveying tube 65M and the first connection part 33 are disconnected, the shutter 33B is moved from the opening position to the closing position by the pressing force of the spring 33C.

2.4 Second Connection Part

As shown in FIGS. 5A and 6B, the second connection part 34 is located on the other outer surface S12 of the drum cartridge 6M in the second direction. The second connection part 34 extends from the second side plate 31B. The second connection part 34 extends in the second direction. The second connection part 34 has a cylindrical shape. The second connection part 34 connects with the drum cleaner 18M. Specifically, the second connection part 34 has a through-hole 34A. The through-hole 34A connects with an internal space of the drum cleaner 18M. The through-hole 34A connects with a waste toner receiving opening 621M (refer to FIG. 11A) of the waste toner conveying tube 62M when the waste toner conveying tube 62M is connected to the second connection part 34. Thereby, the waste toner in the drum cleaner 18M enters the waste toner conveying tube 62M through the through-hole 34A and the waste toner receiving opening 621M. Also, the second connection part 34 has a shutter 34B, a spring 34C, and a second drum coupling 34D. That is, the drum cartridge 6M has the second drum coupling 34D. Also, the second drum coupling 34D is located on the other outer surface S12 of the drum cartridge 6M in the second direction.

The shutter 34B is located in the second connection part 34. The shutter 34B is movable in the second direction between a closing position (refer to FIG. 5A) at which the through-hole 34A is closed and an opening position (refer to FIG. 5B) at which the through-hole 34A is opened.

The spring 34C is located in the second connection part 34. The spring 34C is provided to press the shutter 34B located at the opening position toward the closing position. When the waste toner conveying tube 62M is connected to the second connection part 34, the shutter 34B is pressed by the waste toner conveying tube 62M, and is thus moved from the closing position to the opening position against a pressing force of the spring 34C. Also, when the waste toner conveying tube 62M and the second connection part 34 are disconnected, the shutter 34B is moved from the opening position to the closing position by the pressing force of the spring 34C.

The second drum coupling 34D is located in the second connection part 34. The second drum coupling 34D is rotatable by power from the first drum coupling 32. The second drum coupling 34D is coupled to a conveying tube coupling 624M (refer to FIG. 11A) of the waste toner conveying tube 62M when the waste toner conveying tube 62M is connected to the second connection part 34. The second drum coupling 34D is rotatable together with the conveying tube coupling 624M when the second drum coupling 34D is coupled to the conveying tube coupling 624M. Thereby, the second drum coupling 34D can transmit the power to the conveying tube coupling 624M when the waste toner conveying tube 62M is connected to the second connection part 34.

3. Details of Toner Container

The toner container 7M is described in detail with reference to FIGS. 7A and 7B. In the meantime, the toner containers 7Y, 7C, 7K have the same structure as the toner container 7M, respectively. Therefore, in the below, the descriptions of the toner containers 7Y, 7C, 7K are omitted.

Figure 7A:
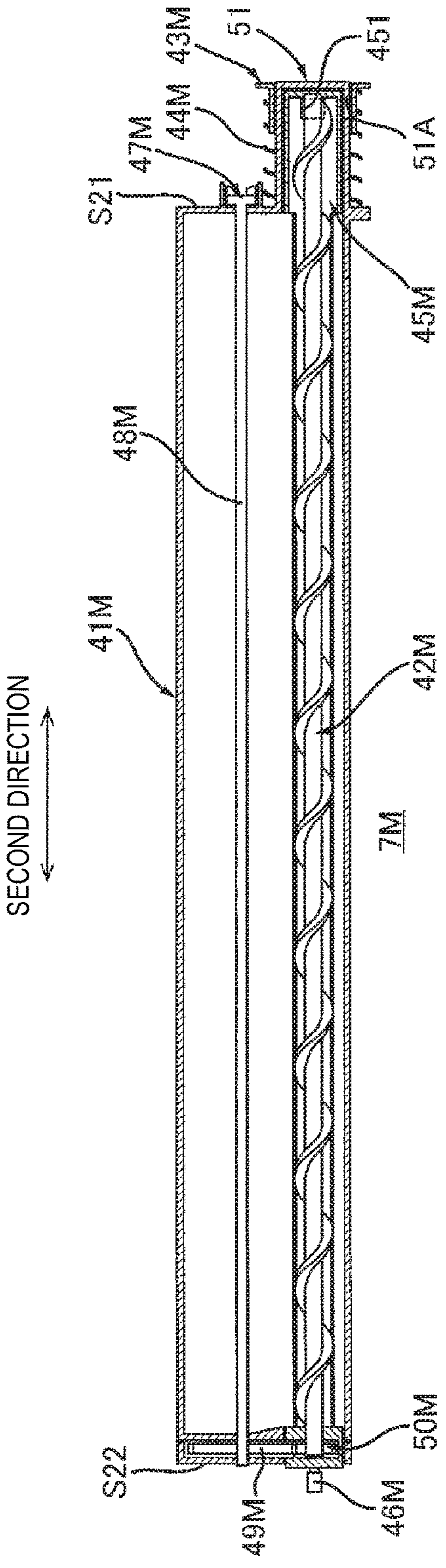
FIG. 7A is a sectional view of a toner container, depicting a state where a first shutter is located at a first closing position and a second shutter is located at a second closing position.

As shown in FIG. 7A, the toner container 7M extends in the second direction. The toner container 7M includes a housing 41M, an auger screw 42M, a first shutter 43M, a spring 44M, a second shutter 45M, a projection 46M, a coupling 47M, a shaft 48M, and two gears 49M, 50M.

3.1 Housing

The housing 41M extends in the second direction. The housing 41M has a cylindrical shape. The housing 41M accommodates the toner. The housing 41M has one outer surface S21 in the second direction and the other outer surface S22 in the second direction. The outer surface S22 is located distant from the outer surface S21 in the second direction. The outer surface S22 is located between the third cover 3C (refer to FIG. 8) and the outer surface S21 in the second direction when the toner container 7M is attached to the image forming apparatus 1. Also, the housing 41M has a protrusion 51.

The protrusion 51 is located on the outer surface S21 of the housing 41M. The protrusion 51 extends from the outer surface S21. The protrusion 51 extends in the second direction. The protrusion 51 has a cylindrical shape. An internal space of the protrusion 51 connects with an internal space of the housing 41M. The protrusion 51 has a toner discharge opening 51A. That is, the housing 41M has the toner discharge opening 51A. The toner discharge opening 51A is located on a peripheral surface of the protrusion 51. The toner discharge opening 51A connects with the internal space of the protrusion 51. Thereby, the toner is discharged through the toner discharge opening 51A.

3.2 Auger Screw

The auger screw 42M is located inside the housing 41M. The auger screw 42M extends in the second direction. The auger screw 42M is rotatable about an axis extending in the second direction. The auger screw 42M conveys the toner in the housing 41M toward the toner discharge opening 51A.

3.3 First Shutter and Spring

The first shutter 43M is located on the outer surface S21 of the housing 41M. Specifically, the first shutter 43M is located on an outer peripheral surface of the protrusion 51. The first shutter 43M is movable in the second direction between a first closing position (refer to FIG. 7A) and a first opening position (refer to FIG. 7B). When the first shutter 43M is located at the first closing position, the first shutter 43M closes the toner discharge opening 51A. When the first shutter 43M is located at the first opening position, the toner discharge opening 51A is opened.

The spring 44M is provided to press the first shutter 43M located at the opening position toward the closing position. When the toner container 7M is attached to the image forming apparatus 1, the first shutter 43M comes in contact with a part of the image forming apparatus 1, thereby moving from the closing position to the opening position against a pressing force of the spring 44M. In the meantime, when the toner container 7M is detached from the image forming apparatus 1, the first shutter 43M is moved from the opening position to the closing position by the pressing force of the spring 44M.

3.4 Second Shutter and Projection

The second shutter 45M is located inside the housing 41M. Specifically, the second shutter 45M is located in the protrusion 51. The second shutter 45M is movable between a second closing position (refer to FIG. 7A) and a second opening position (refer to FIG. 7B). When the second shutter 45M is located at the second closing position, the second shutter 45M closes the toner discharge opening 51A. When the second shutter 45M is located at the second opening position, the toner discharge opening 51A is opened. Specifically, as shown in FIG. 7B, the second shutter 45M extends from the outer surface S22 of the housing 41M to the protrusion 51 in the second direction. The second shutter 45M is rotatable about an axis extending in the second direction between the second closing position and the second opening position. The second shutter 45M has an opening 451. The opening 451 connects with the toner discharge opening 51A when the second shutter 45M is located at the opening position. On the other hand, the opening 451 is located distant from the toner discharge opening 51A and does not connect with the toner discharge opening 51A, when the second shutter 45M is located at the closing position.

The projection 46M is located on the outer surface S22 of the housing 41M. The projection 46M is rotatable about an axis extending in the second direction, together with the second shutter 45M. A user can move the second shutter 45M between the opening position and the closing position by turning the projection 46M.

3.5 Coupling, Shaft and Two Gears

The coupling 47M is located on the outer surface S21 of the housing 41M. The coupling 47M is rotatable about an axis extending in the second direction. The coupling 47M is coupled to a coupling 100 (refer to FIGS. 8 and 12) in the main body housing 2 when the toner container 7M is attached to the image forming apparatus 1. The coupling 47M is rotatable together with the coupling 100 when the coupling 47M is coupled to the coupling 100. Thereby, the coupling 47M enables to receive the power from the coupling 100 when the toner container 7M is attached to the image forming apparatus 1.

The shaft 48M extends in the second direction. The shaft 48M is rotatable about an axis extending in the second direction together with the coupling 47M. Specifically, the shaft 48M has a first end that is to be connected to the coupling 47M and a second end that is located distant from the first end in the second direction.

The gear 49M is mounted to the second end of the shaft 48M. The gear 49M is rotatable together with the shaft 48M.

The gear 50M is mounted to the auger screw 42M. The gear 50M is rotatable together with the auger screw 42M. The gear 50M is in mesh with the gear 49M. The power received from the coupling 100 by the coupling 47M is transmitted to the auger screw 42M by the shaft 48M, the gear 49M and the gear 50M.

4. Details of Image Forming Apparatus

Subsequently, the image forming apparatus 1 is described in detail with reference to FIGS. 8 to 15.

Figure 9:
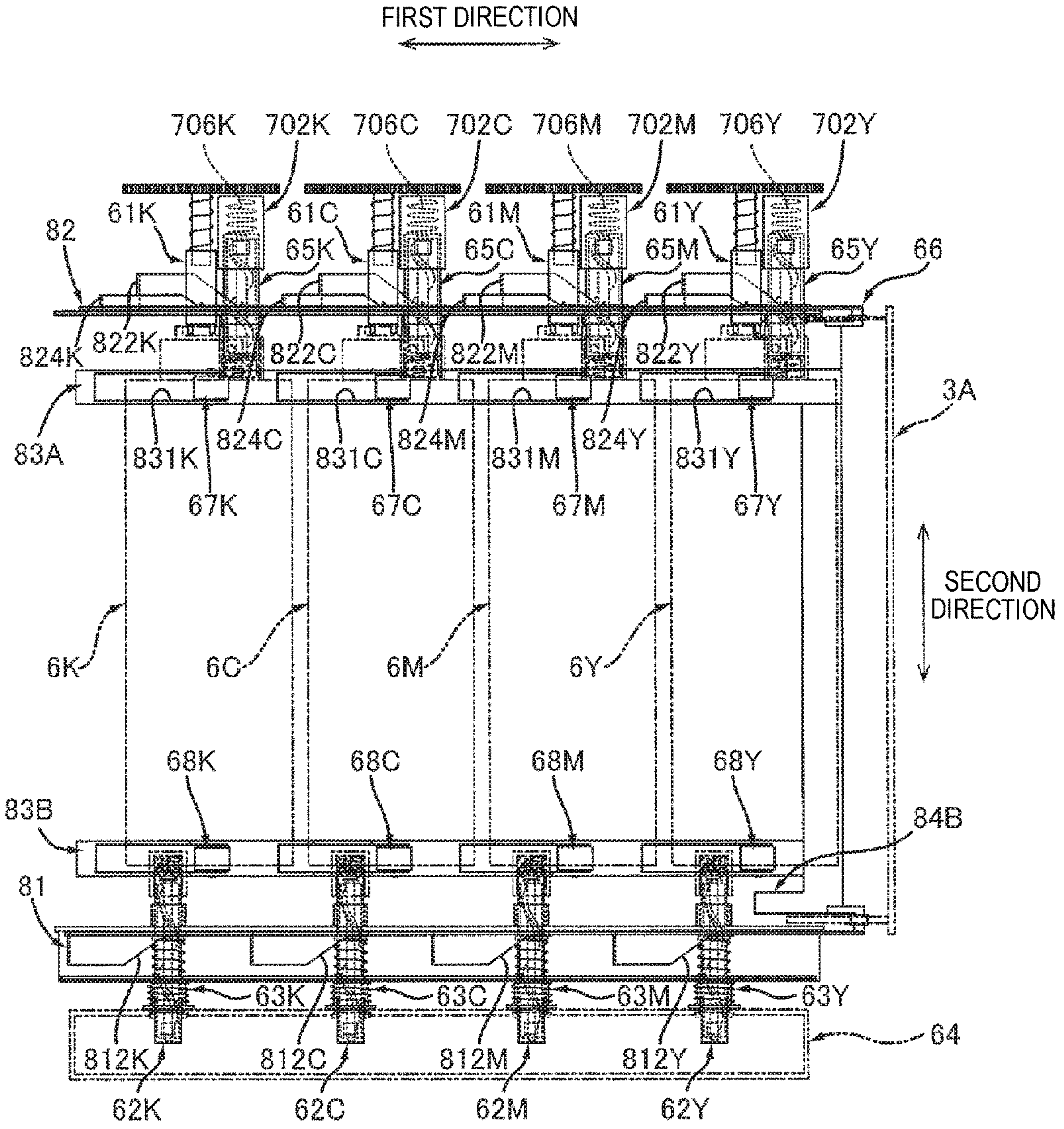
FIG. 9 illustrates an interlock between a cover, a waste toner conveying tube, a toner conveying tube and a main body coupling, depicts a state where the cover is located at the closing position, the waste toner conveying tube is located at a first connection position, the toner conveying tube is located at a second connection position and the main body coupling is located at a main body coupling connecting position.

As shown in FIG. 8 or 9, the image forming apparatus 1 includes four main body couplings 61Y, 61M, 61C, 61K, four waste toner conveying tubes 62Y, 62M, 62C, 62K, four shutters 63Y, 63M, 63C, 63K, a waste toner container 64, four toner conveying tubes 65Y, 65M, 65C, 65K, four connection members 70Y, 70M, 70C, 70K (refer to FIG. 2), eight pressing members 67Y, 67M, 67C, 67K, 68Y, 68M, 68C, 68K, a cam 66, and two circuit boards 69A, 69B.

4.1 Main Body Coupling

The four main body couplings 61Y, 61M, 61C, 61K are located inside the main body housing 2. The four main body couplings 61Y, 61M, 61C, 61K are aligned side by side the first direction, as shown in FIG. 9. The main body coupling 61Y is located at an opposite side to the waste toner conveying tube 62Y with respect to the drum cartridge 6Y in the second direction. The main body coupling 61M is located at an opposite side to the waste toner conveying tube 62M with respect to the drum cartridge 6M in the second direction. The main body coupling 61C is located at an opposite side to the waste toner conveying tube 62C with respect to the drum cartridge 6C in the second direction. The main body coupling 61K is located at an opposite side to the waste toner conveying tube 62K with respect to the drum cartridge 6K in the second direction.

Figure 10:
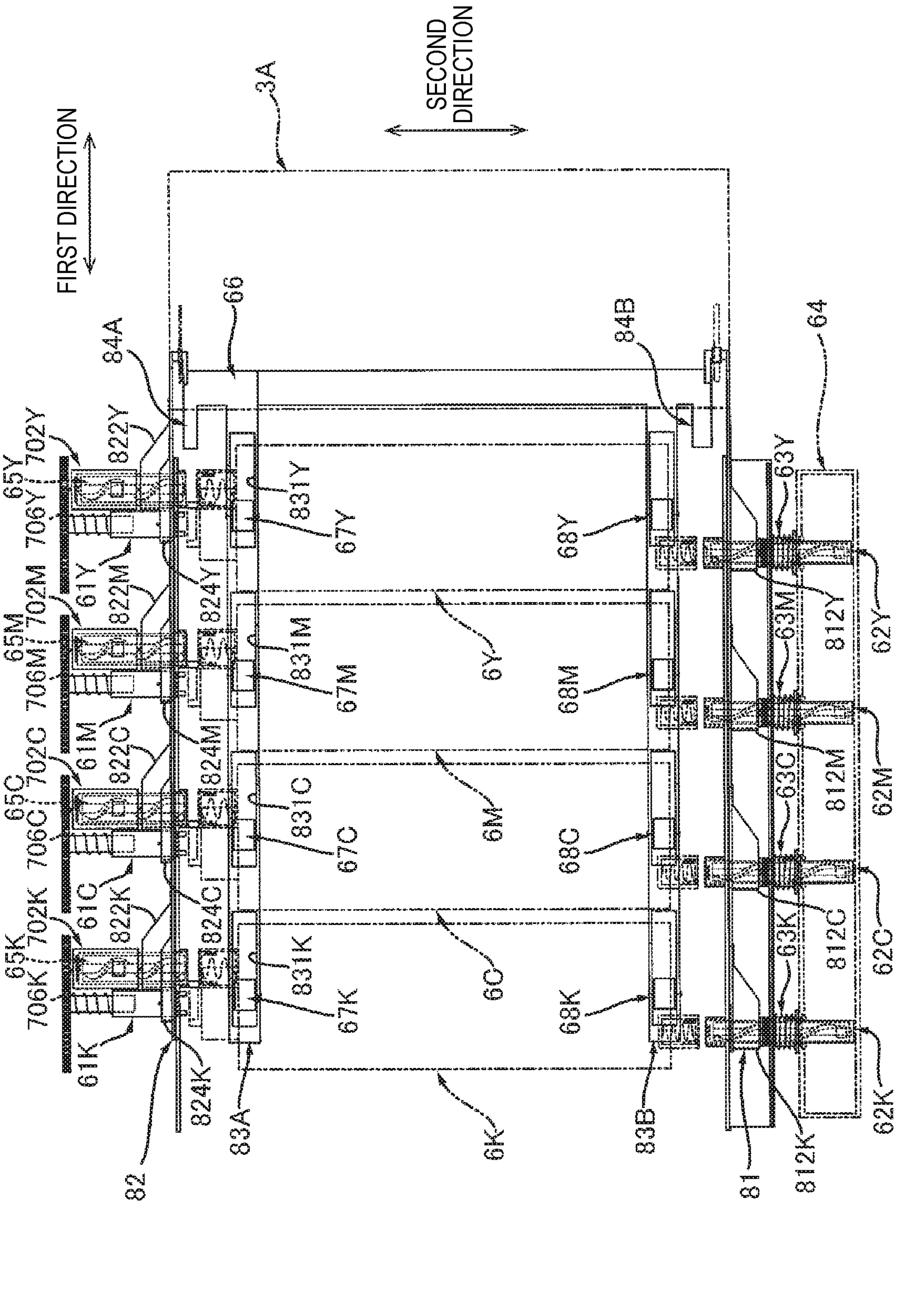
FIG. 10 illustrates the interlock between the cover, the waste toner conveying tube, the toner conveying tube and the main body coupling, together with FIG. 9, depicts a state where the cover is located at the opening position, the waste toner conveying tube is located at a first disconnection position, the toner conveying tube is located at a second disconnection position, and the main body coupling is located at a main body coupling disconnecting position.

Each of the four main body couplings 61Y, 61M, 61C, 61K is movable in the second direction between a main body coupling connecting position (refer to FIG. 9) and a main body coupling disconnecting position (refer to FIG. 10), as shown in FIGS. 9 and 10.

When the drum cartridge 6M is attached to the drawer 5 and the drawer 5 is located at the inner position, when the main body coupling 61M is located at the main body coupling connecting position, the main body coupling 61M is connected to the first drum coupling 32 (refer to FIG. 6A) of the drum cartridge 6M. Thereby, the main body coupling 61M transmits the power from the image forming apparatus 1 to the drum cartridge 6M when the drum cartridge 6M is attached to the drawer 5 and the drawer 5 is located at the inner position.

On the other hand, when the drum cartridge 6M is attached to the drawer 5 and the drawer 5 is located at the inner position, when the main body coupling 61M is located at the main body coupling disconnecting position, the main body coupling 61M is separated from the first drum coupling 32 of the drum cartridge 6M. Thereby, the transmission of the power from the image forming apparatus 1 to the drum cartridge 6M is released.

In the meantime, the main body couplings 61Y, 61C, 61K have the same structure as the main body coupling 61M, respectively. Therefore, the descriptions of the main body couplings 61Y, 61C, 61K are omitted.

4.2 Waste Toner Conveying Tube

As shown in FIG. 9, the four waste toner conveying tubes 62Y, 62M, 62C, 62K are aligned side by side in the first direction. As shown in FIGS. 9 and 10, each of the four waste toner conveying tubes 62Y, 62M, 62C, 62K is movable in the second direction between a first connection position (refer to FIG. 9) and a first disconnection position (refer to FIG. 10). When the cover 3A moves from the closing position (refer to FIG. 2) toward the opening position (refer to FIG. 3) when the drawer 5 having the four drum cartridges 6Y, 6M, 6C, 6K attached thereto is located at the inner position, each of the four waste toner conveying tubes 62Y, 62M, 62C, 62K moves from the first connection position toward the first disconnection position in conjunction with the movement of the cover 3A.

As shown in FIG. 9, when the waste toner conveying tube 62Y is located at the first connection position, the waste toner conveying tube 62Y is connected to the second connection part 34 (refer to FIG. 6B) of the drum cartridge 6Y. When the waste toner conveying tube 62M is located at the first connection position, the waste toner conveying tube 62M is connected to the second connection part 34 of the drum cartridge 6M. When the waste toner conveying tube 62C is located at the first connection position, the waste toner conveying tube 62C is connected to the second connection part 34 of the drum cartridge 6C. When the waste toner conveying tube 62K is located at the first connection position, the waste toner conveying tube 62K is connected to the second connection part 34 of the drum cartridge 6K. Also, when the waste toner container 64 is attached to the image forming apparatus 1, each of the four waste toner conveying tubes 62Y, 62M, 62C, 62K is connected to the waste toner container 64.

Thereby, when the waste toner conveying tube 62Y is located at the first connection position, the waste toner conveying tube 62Y is used to convey the waste toner from the drum cartridge 6Y to the waste toner container 64. When the waste toner conveying tube 62M is located at the first connection position, the waste toner conveying tube 62M is used to convey the waste toner from the drum cartridge 6M to the waste toner container 64. When the waste toner conveying tube 62C is located at the first connection position, the waste toner conveying tube 62C is used to convey the waste toner from the drum cartridge 6C to the waste toner container 64. When the waste toner conveying tube 62K is located at the first connection position, the waste toner conveying tube 62K is used to convey the waste toner from the drum cartridge 6K to the waste toner container 64.

On the other hand, as shown in FIG. 10, when the waste toner conveying tube 62Y is located at the first disconnection position, the waste toner conveying tube 62Y is disconnected from the drum cartridge 6Y. When the waste toner conveying tube 62M is located at the first disconnection position, the waste toner conveying tube 62M is disconnected from the drum cartridge 6M. When the waste toner conveying tube 62C is located at the first disconnection position, the waste toner conveying tube 62C is disconnected from the drum cartridge 6C. When the waste toner conveying tube 62K is located at the first disconnection position, the waste toner conveying tube 62K is disconnected from the drum cartridge 6K.

Figure 11A:
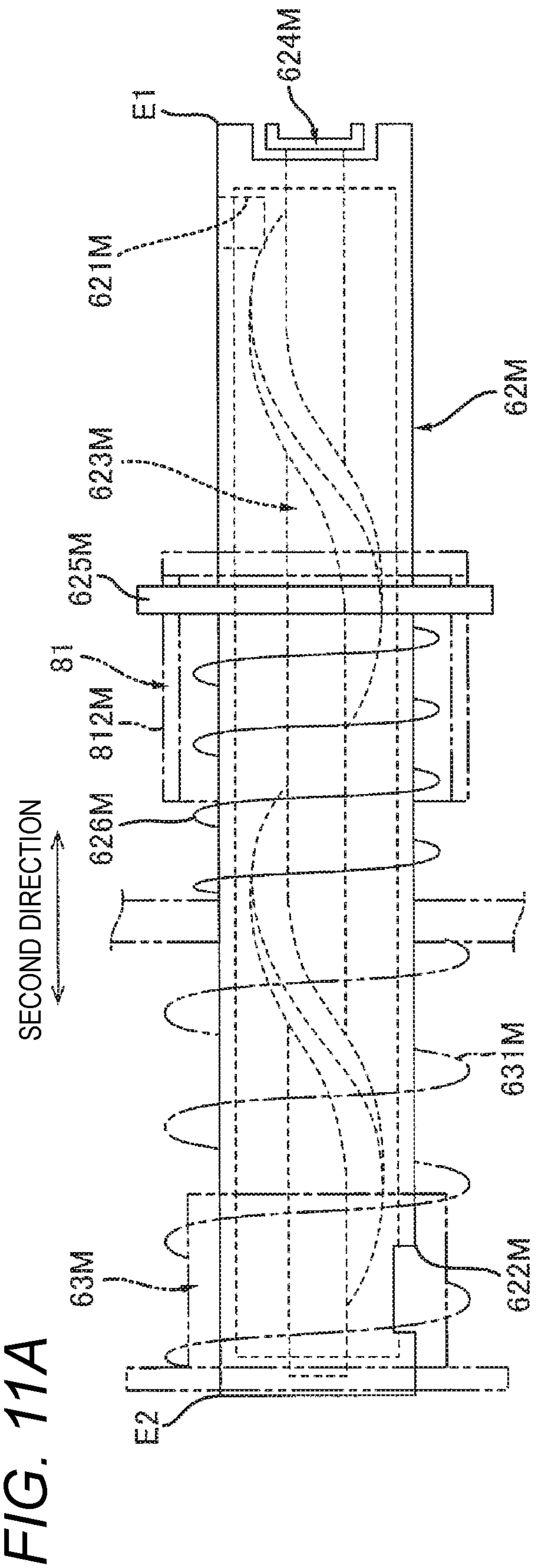
FIG. 11A is an enlarged view of the waste toner conveying tube shown in FIG. 8.

As shown in FIG. 11A, the waste toner conveying tube 62M extends in the second direction. The waste toner conveying tube 62M has a first end E1 and a second end E2 in the second direction. The first end E1 is connected to the second connection part 34 (refer to FIG. 5A) of the drum cartridge 6M when the waste toner conveying tube 62M is located at the first connection position. The second end E2 is located distant from the first end E1 in the second direction. The second end E2 is connected to the waste toner container 64 (refer to FIG. 8) when the waste toner container 64 is attached to the image forming apparatus 1. The waste toner conveying tube 62M has a cylindrical shape. The waste toner conveying tube 62M has a waste toner receiving opening 621M and a waste toner discharge opening 622M. Also, the waste toner conveying tube 62M has an auger screw 623M, a conveying tube coupling 624M, and a projection 625M.

The waste toner receiving opening 621M is located at an end portion including the first end E1 of the waste toner conveying tube 62M. The waste toner receiving opening 621M connects with an internal space of the waste toner conveying tube 62M. The waste toner receiving opening 621M connects with the through-hole 34A (refer to FIG. 6B) of the second connection part 34 of the drum cartridge 6M when the waste toner conveying tube 62M is located at the first connection position. Thereby, when the waste toner conveying tube 62M is located at the first connection position, the waste toner conveying tube 62M enables to receive the waste toner from the drum cleaner 18M of the drum cartridge 6M.

The waste toner discharge opening 622M is located at an end portion including the second end E2 of the waste toner conveying tube 62M. The waste toner discharge opening 622M connects with an internal space of the waste toner conveying tube 62M. Thereby, the waste toner in the waste toner conveying tube 62M is discharged through the waste toner discharge opening 622M.

Figure 14:
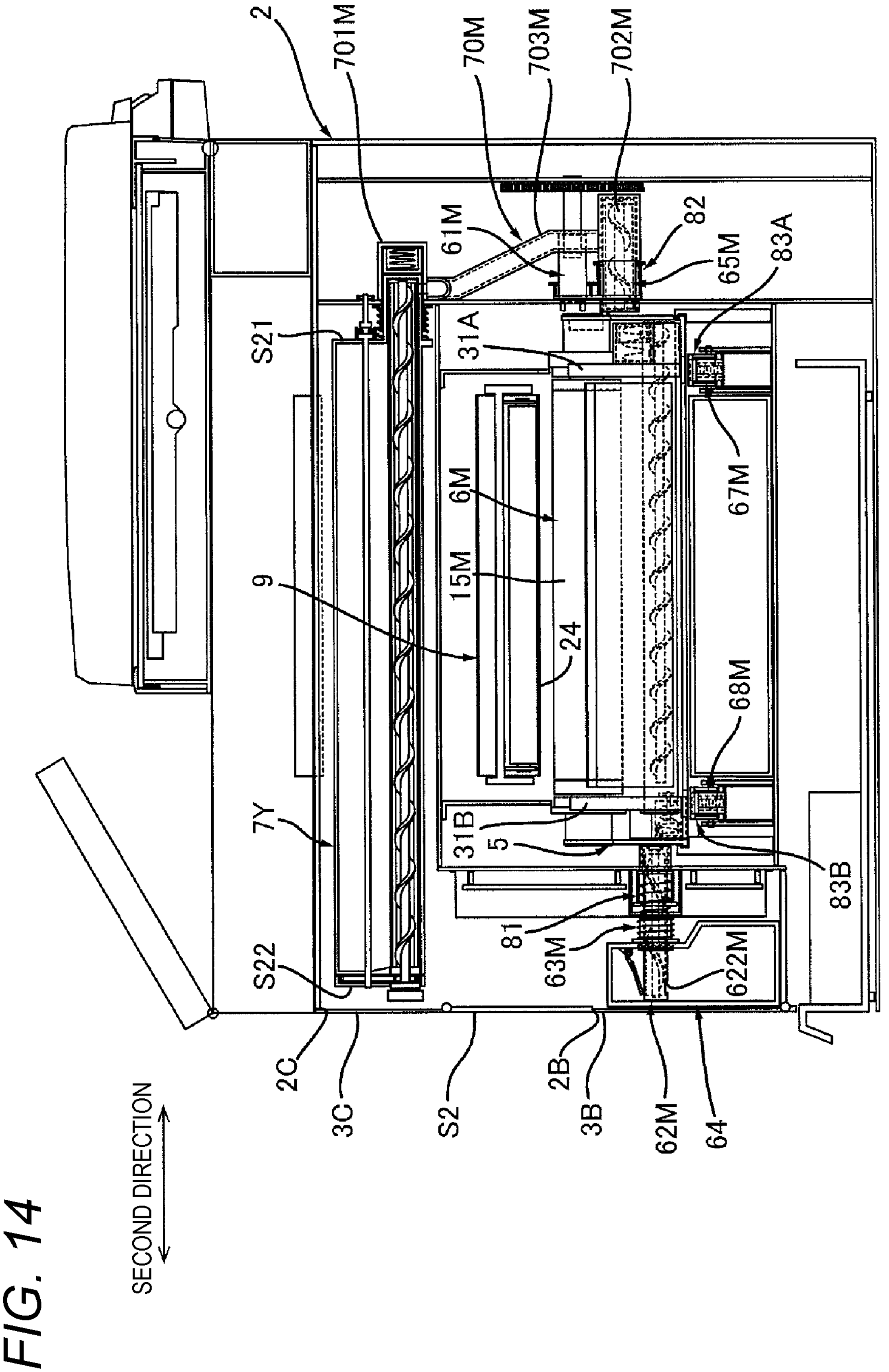
FIG. 14 depicts the image forming apparatus shown in FIG. 8 in which the cover is located at the opening position.

As shown in FIGS. 8 and 14, the waste toner discharge opening 622M is located inside the waste toner container 64 both in a case where the waste toner conveying tube 62M is located at the first connection position (refer to FIG. 8) and in a case where the waste toner conveying tube 62M is located at the first disconnection position (refer to FIG. 14). Thereby, when the waste toner conveying tube 62M moves, the toner discharged from the waste toner discharge opening 622M can be suppressed from being leaked to an outside of the waste toner container 64.

The auger screw 623M is located inside the waste toner conveying tube 62M. The auger screw 623M extends in the second direction. The auger screw 623M is rotatable about an axis extending in the second direction. The auger screw 623M conveys the waste toner in the waste toner conveying tube 62M from the waste toner receiving opening 621M toward the waste toner discharge opening 622M.

The conveying tube coupling 624M is located at the first end E1 of the waste toner conveying tube 62M. The conveying tube coupling 624M is located on one outer surface of the waste toner conveying tube 62M in the second direction. The conveying tube coupling 624M is rotatable about an axis extending in the second direction, together with the auger screw 623M. The conveying tube coupling 624M is coupled to the second drum coupling 34D (refer to FIG. 6B) when the drum cartridge 6M is attached to the drawer 5, the drawer 5 is located at the inner position and the waste toner conveying tube 62M is located at the first connection position. The conveying tube coupling 624M is rotatable together with the second drum coupling 34D when the conveying tube coupling 624M is coupled to the second drum coupling 34D. Thereby, the auger screw 623M enables to rotate by the power received from the drum cartridge 6M, when the drum cartridge 6M is attached to the drawer 5, the drawer 5 is located at the inner position and the waste toner conveying tube 62M is located at the first connection position.

The projection 625M is located between the waste toner receiving opening 621M and the waste toner discharge opening 622M in the second direction. The projection 625M protrudes from the outer peripheral surface of the waste toner conveying tube 62M. The projection 625M is in contact with the spring 626M. The spring 626M is provided to press the projection 625M of the waste toner conveying tube 62M located at the first disconnection position in a direction in which the waste toner conveying tube 62M faces toward the first connection position. Also, when the cover 3A moves from the closing position toward the opening position, a first pressing part 812M of the cam 66, which will be described later, comes in contact with the projection 625M. The first pressing part 812M will be described later. Then, the waste toner conveying tube 62M is pressed by the first pressing part 812M of the cam 66 and is thus moved from the first connection position toward the first disconnection position, against a pressing force of the spring 626M.

In the meantime, the waste toner conveying tubes 62Y, 62C, 62K have the same structure as the waste toner conveying tube 62M, respectively. Therefore, the descriptions of the waste toner conveying tubes 62Y, 62C, 62K are omitted.

4.3 Shutter

Figure 11B:
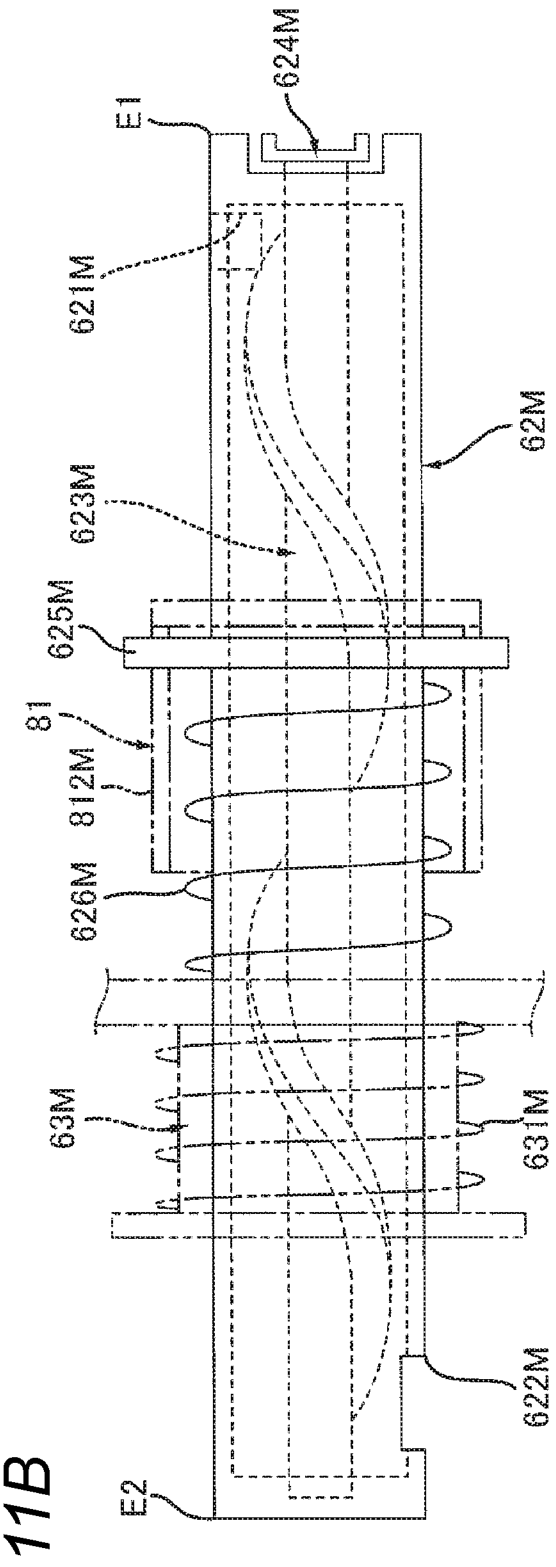
FIG. 11B depicts the waste toner conveying tube shown in FIG. 11A in which the shutter of is located at the opening position.

As shown in FIGS. 11A and 11B, the shutter 63M is movable in the second direction between the closing position (refer to FIG. 11A) and the opening position (refer to FIG. 11B). When the shutter 63M is located at the closing position, the shutter 63M closes the waste toner discharge opening 622M. When the shutter 63M is located at the opening position, the waste toner discharge opening 622M is opened.

When the waste toner container 64 (refer to FIG. 8) is being attached to the image forming apparatus 1, the shutter 63M is moved from the closing position to the opening position with being in contact with the waste toner container 64. Also, when the waste toner container 64 is being detached from the image forming apparatus 1, the shutter 63M is moved from the opening position to the closing position with being in contact with the waste toner container 64.

Also, as shown in FIGS. 9 and 10, the waste toner conveying tube 62M is movable between the first connection position (refer to FIG. 9) and the first disconnection position (refer to FIG. 10) when the waste toner container 64 is attached to the image forming apparatus 1 and the shutter 63M is located at the opening position.

As shown in FIG. 11A, the shutter 63M extends in the second direction. The shutter 63M has a cylindrical shape. The shutter 63M is located on the peripheral surface of the waste toner conveying tube 62M. As shown in FIG. 11B, the shutter 63M located at the opening position is pressed toward the closing position by the spring 631M.

In the meantime, the shutters 63Y, 63C, 63K have the same structure as the shutter 63M, respectively. Therefore, the descriptions of the shutters 63Y, 63C, 63K are omitted.

4.4 Waste Toner Container

Figure 12:
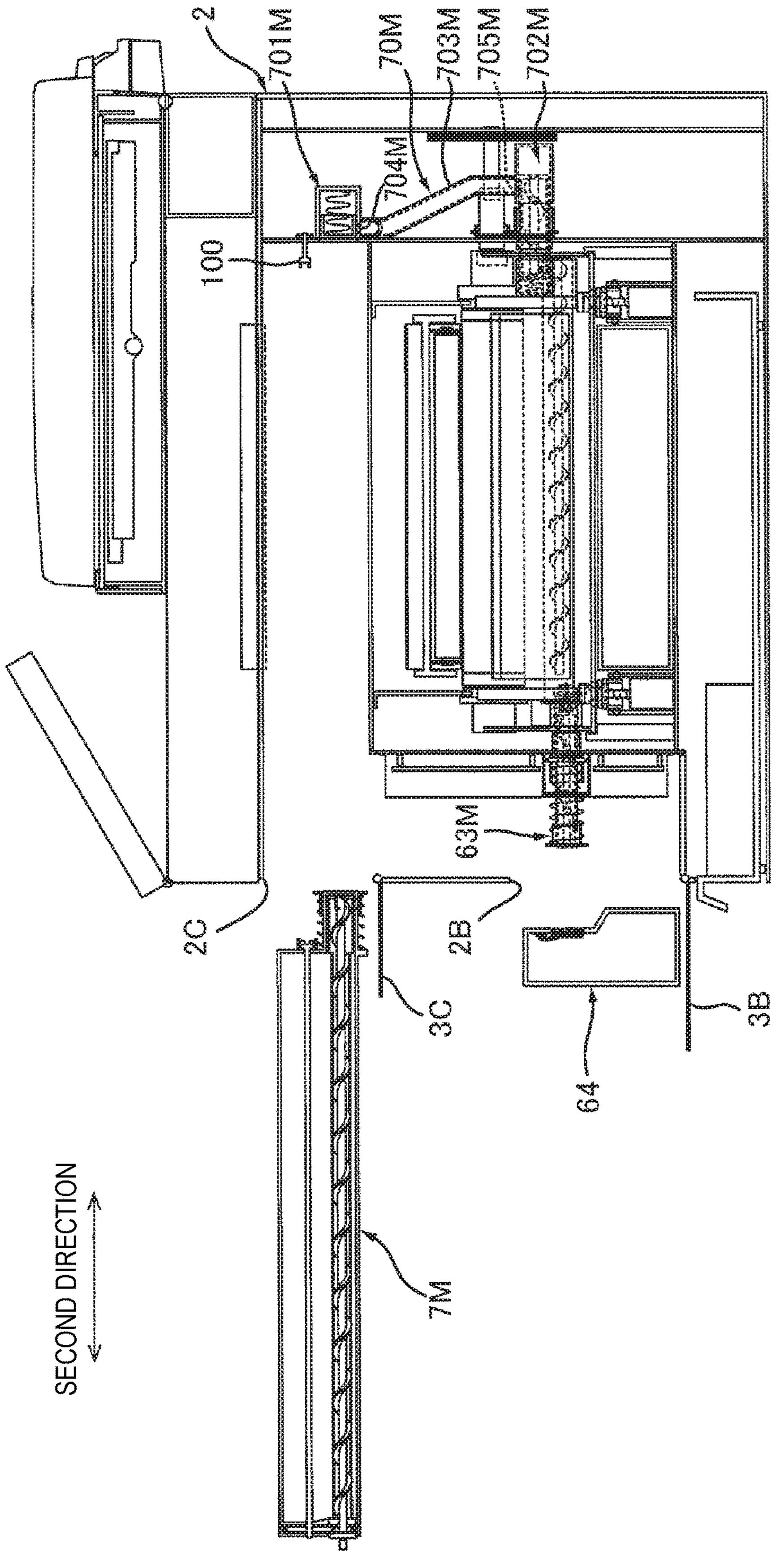
FIG. 12 depicts a state where the waste toner container and the toner container are detached from the image forming apparatus.

As shown in FIG. 9, the waste toner container 64 has a box shape extending in the first direction. The waste toner container 64 is connected to the four waste toner conveying tubes 62Y, 62M, 62C, 62K when it is attached to the image forming apparatus 1. When the waste toner container 64 is attached to the image forming apparatus 1, the waste toner container 64 accommodates the waste toner removed from the peripheral surface of the photosensitive drum 15Y by the drum cleaner 18Y, the waste toner removed from the peripheral surface of the photosensitive drum 15M by the drum cleaner 18M, the waste toner removed from the peripheral surface of the photosensitive drum 15C by the drum cleaner 18C and the waste toner removed from the peripheral surface of the photosensitive drum 15K by the drum cleaner 18K. The waste toner container 64 is attachable to and detachable from the main body housing 2 in the second direction through the second opening 2B when the second cover 3B is located at the opening position, as shown in FIG. 12.

4.5 Toner Conveying Tube

As shown in FIG. 9, the four toner conveying tubes 65Y, 65M, 65C, 65K are aligned side by side in the first direction. The toner conveying tube 65Y is located at an opposite side to the waste toner conveying tube 62Y with respect to the drum cartridge 6Y in the second direction. The toner conveying tube 65M is located at an opposite side to the waste toner conveying tube 62M with respect to the drum cartridge 6M in the second direction. The toner conveying tube 65C is located at an opposite side to the waste toner conveying tube 62C with respect to the drum cartridge 6C in the second direction. The toner conveying tube 65K is located at an opposite side to the waste toner conveying tube 62K with respect to the drum cartridge 6K in the second direction.

As shown in FIGS. 9 and 10, each of the four toner conveying tubes 65Y, 65M, 65C, 65K is movable between a second connection position (refer to FIG. 9) and a second disconnection position (refer to FIG. 10). When the cover 3A moves from the closing position (refer to FIG. 2) toward the opening position (refer to FIG. 3) when the drawer 5 having the four drum cartridges 6Y, 6M, 6C, 6K attached thereto is located at the inner position, each of the four toner conveying tubes 65Y, 65M, 65C, 65K moves from the second connection position toward the second disconnection position in conjunction with the movement of the cover 3A.

As shown in FIG. 9, when the toner conveying tube 65Y is located at the second connection position, the toner conveying tube 65Y is connected to the drum cartridge 6Y. The toner conveying tube 65Y is used to convey the toner from the toner container 7Y (refer to FIG. 2) to the drum cartridge 6Y when it is connected to the drum cartridge 6Y. When the toner conveying tube 65M is located at the second connection position, the toner conveying tube 65M is connected to the drum cartridge 6M. The toner conveying tube 65M is used to convey the toner from the toner container 7M (refer to FIG. 2) to the drum cartridge 6M when it is connected to the drum cartridge 6M. When the toner conveying tube 65C is located at the second connection position, the toner conveying tube 65C is connected to the drum cartridge 6C. The toner conveying tube 65C is used to convey the toner from the toner container 7C (refer to FIG. 2) to the drum cartridge 6C when it is connected to the drum cartridge 6C. When the toner conveying tube 65K is located at the second connection position, the toner conveying tube 65K is connected to the drum cartridge 6K. The toner conveying tube 65K is used to convey the toner from the toner container 7K (refer to FIG. 2) to the drum cartridge 6K when it is connected to the drum cartridge 6K.

On the other hand, as shown in FIG. 10, when the toner conveying tube 65Y is located at the second disconnection position, the toner conveying tube 65Y is separated from the drum cartridge 6Y. Thereby, the toner conveying tube 65Y and the drum cartridge 6Y are disconnected. When the toner conveying tube 65M is located at the second disconnection position, the toner conveying tube 65M is separated from the drum cartridge 6M. Thereby, the toner conveying tube 65M and the drum cartridge 6M are disconnected. When the toner conveying tube 65C is located at the second disconnection position, the toner conveying tube 65C is separated from the drum cartridge 6C. Thereby, the toner conveying tube 65C and the drum cartridge 6C are disconnected. When the toner conveying tube 65K is located at the second disconnection position, the toner conveying tube 65K is separated from the drum cartridge 6K. Thereby, the toner conveying tube 65K and the drum cartridge 6K are disconnected.

When the four waste toner conveying tubes 62Y, 62M, 62C, 62K are all located at the first disconnection position and the four toner conveying tubes 65Y, 65M, 65C, 65K are all located at the second disconnection position, the drawer 5 having the four drum cartridges 6Y, 6M, 6C, 6K attached thereto enables to be moved from the inner position toward the outer position.

Figure 13:
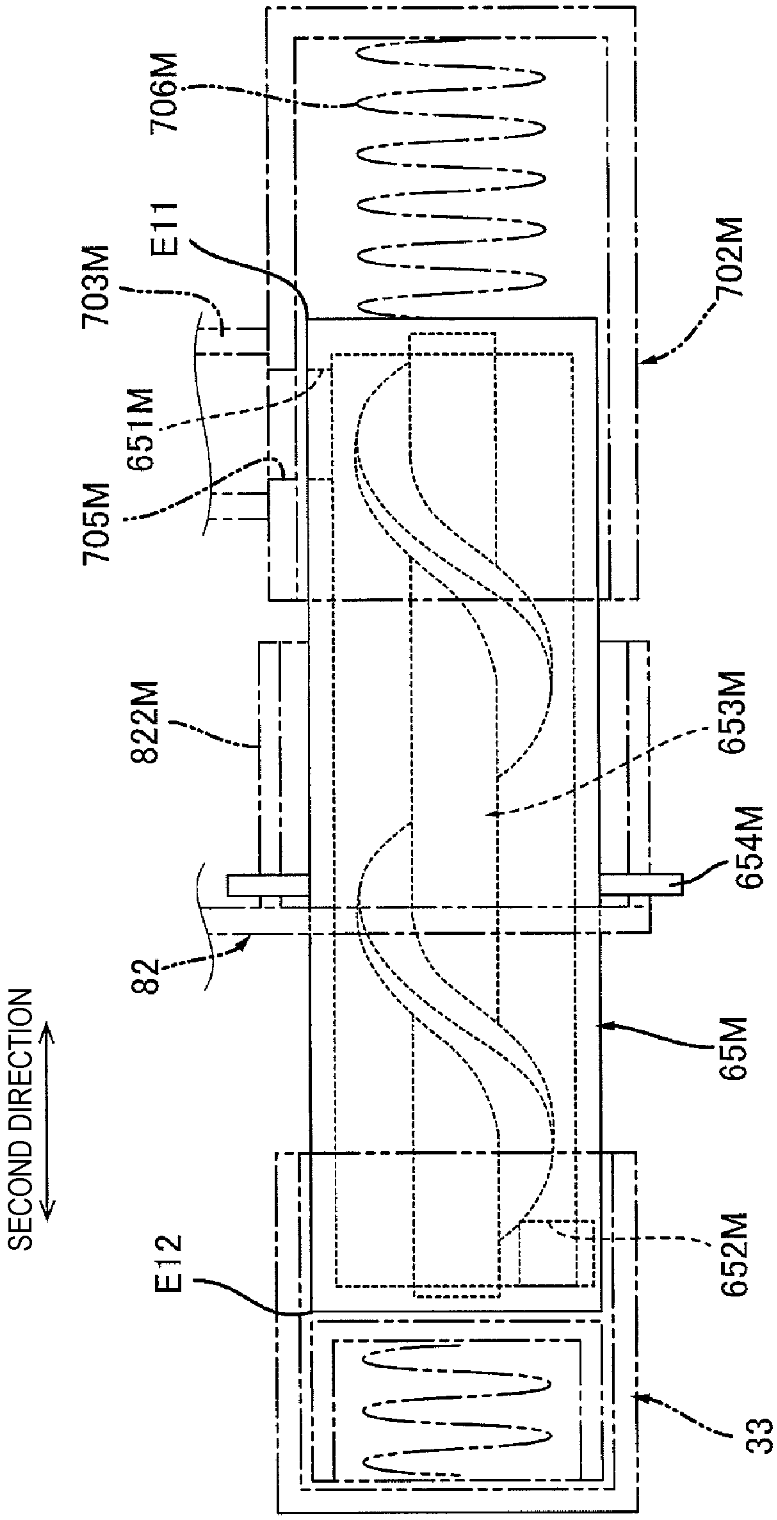
FIG. 13 is an enlarged view of the toner conveying tube shown in FIG. 8.

As shown in FIG. 13, the toner conveying tube 65M extends in the second direction. The toner conveying tube 65M has a first end E11 and a second end E12 in the second direction. The first end E11 is fitted in a second tube 702M of the connection member 70M. The connection member 70M will be described later. The second end E12 is located distant from the first end E11 in the second direction. The second end E12 is connected to the first connection part 33 of the drum cartridge 6M when the toner conveying tube 65M is located at the second connection position. The toner conveying tube 65M has a cylindrical shape. The toner conveying tube 65M has a toner receiving opening 651M and a toner discharge opening 652M. Also, the toner conveying tube 65M has an auger screw 653M and a projection 654M.

The toner receiving opening 651M is located at an end portion including the first end E11 of the toner conveying tube 65M. The toner receiving opening 651M connects with an internal space of the toner conveying tube 65M. The toner receiving opening 651M connects with a through-hole 705M of the second tube 702M of the drum cartridge 6M when the toner conveying tube 65M is located at the second connection position. Thereby, when the toner conveying tube 65M is located at the second connection position, the toner conveying tube 65M enables to receive the toner from the toner container 7M.

The toner discharge opening 652M is located at an end portion including the second end E12 of the toner conveying tube 65M. The toner discharge opening 652M connects with the internal space of the toner conveying tube 65M. Also, when the drum cartridge 6M is attached to the drawer 5, the drawer 5 is located at the inner position and the toner conveying tube 65M is located at the second connection position, the toner discharge opening 652M connects with the through-hole 33A (refer to FIG. 5B) of the first connection part 33. Thereby, the toner in the toner conveying tube 65M enters the developing device 17M through the toner discharge opening 652M, the through-hole 33A, and the receiving opening 173 (refer to FIG. 6A) of the developing device 17M.

The auger screw 653M is located inside the toner conveying tube 65M. The auger screw 653M extends in the second direction. The auger screw 653M is rotatable about an axis extending in the second direction. The auger screw 653M conveys the waste toner in the toner conveying tube 65M from the toner receiving opening 651M toward the toner discharge opening 652M.

The projection 654M is located between the toner receiving opening 651M and the toner discharge opening 652M in the second direction. The projection 654M protrudes from the outer peripheral surface of the toner conveying tube 65M. When the toner conveying tube 65M moves from the second connection position toward the second disconnection position, a second pressing part 822M of the cam 66 comes in contact with the projection 654M. The second pressing part 822M will be described later. The toner conveying tube 65M is pressed by the second pressing part 822M of the cam 66 and is thus moved from the second connection position toward the second disconnection position, against a pressing force of a spring 706M provided in the second tube 702M.

In the meantime, the toner conveying tubes 65Y, 65C, 65K have the same structure as the toner conveying tube 65M, respectively. Therefore, the descriptions of the toner conveying tubes 65Y, 65C, 65K are omitted.

4.6 Connection Member

As shown in FIG. 2, the four connection members 70Y, 70M, 70C, 70K are aligned side by side in the first direction. The connection member 70Y interconnects the toner container 7Y and the toner conveying tube 65Y. The connection member 70M interconnects the toner container 7M and the toner conveying tube 65M. The connection member 70C interconnects the toner container 7C and the toner conveying tube 65C. The connection member 70K interconnects the toner container 7K and the toner conveying tube 65K.

Specifically, as shown in FIGS. 8 and 12, the connection member 70M has a first tube 701M, a second tube 702M, and a pipe 703M. In the meantime, the connection members 70Y, 70C, 70K have the same structure as the connection member 70M, respectively. Therefore, in the below, the descriptions of the connection members 70Y, 70C, 70K are omitted.

The first tube 701M is located inside the main body housing 2. The first tube 701M extends in the second direction. The first tube 701M has a cylindrical shape. The first tube 701M receives the protrusion 51 (refer to FIG. 7B) of the toner container 7M when the toner container 7M is attached to the image forming apparatus 1. The first tube 701M has a through-hole 704M. The through-hole 704M connects with the toner discharge opening 51A (refer to FIG.

7B) of the toner container 7M when the toner container 7M is attached to the image forming apparatus 1.

The second tube 702M is located below the first tube 701M in the main body housing 2. The second tube 702M extends in the second direction. The second tube 702M has a cylindrical shape. The second tube 702M receives the first end E11 (refer to FIG. 13) of the toner conveying tube 65M. The second tube 702M has a through-hole 705M. The through-hole 705M connects with the toner receiving opening 651M (refer to FIG. 13) of the toner conveying tube 65M when the toner conveying tube 65M is located at the second connection position. Also, the second tube 702M has a spring 706M (refer to FIGS. 9 and 10). The spring 706M is provided to press the toner conveying tube 65M located at the second disconnection position toward the second connection position.

The pipe 703M interconnects the first tube 701M and the second tube 702M. One end of the pipe 703M is connected to the first tube 701M. The other end of the pipe 703M is connected to the second tube 702M. An internal space of the pipe 703M connects with the through-hole 704M and the through-hole 705M. Thereby, when the toner conveying tube 65M is located at the second connection position, the toner in the toner container 7M enters the toner conveying tube 65M through the pipe 703M.

4.7 Pressing Member

As shown in FIG. 8, the pressing member 67M and the pressing member 68M are configured to press the drum cartridge 6M upward when the drum cartridge 6M is attached to the drawer 5, the drawer 5 is located at the inner position and the cover 3A is located at the closing position. Thereby, the photosensitive drum 15M comes in contact with the intermediate transfer belt 24.

Specifically, as shown in FIGS. 8 and 14, the pressing member 67M is movable vertically between a first pressing position (refer to FIG. 8) and a first pressing-release position (refer to FIG. 14). When the pressing member 67M is located at the first pressing position, the pressing member 67M is in contact with the first side plate 31A of the drum cartridge 6M. When the pressing member 67M is moved from the first pressing-release position toward the first pressing position, the pressing member 67M presses upward the first side plate 31A of the drum cartridge 6M. On the other hand, when the pressing member 67M is located at the first pressing-release position, the pressing member 67M is separated from the first side plate 31A of the drum cartridge 6M. Thereby, the pressing of the pressing member 67M to the drum cartridge 6M is released.

The pressing member 68M is located distant from the pressing member 67M in the second direction. The pressing member 68M is movable vertically between a second pressing position (refer to FIG. 8) and a second pressing-release position (refer to FIG. 14). When the pressing member 68M is located at the second pressing position, the pressing member 68M is in contact with the second side plate 31B of the drum cartridge 6M. When the pressing member 68M is moved from the second pressing-release position toward the second pressing position, the pressing member 68M presses upward the second side plate 31B of the drum cartridge 6M. The pressing member 67M presses the first side plate 31A and the pressing member 68M presses the second side plate 31B, so that the drum cartridge 6M is pushed up. Thereby, the photosensitive drum 15M comes in contact with the intermediate transfer belt 24. On the other hand, when the pressing member 68M is located at the second pressing-release position, the pressing member 68M is separated from the second side plate 31B of the drum cartridge 6M. Thereby, the pressing of the pressing member 68M to the drum cartridge 6M is released. The pressing member 67M is separated from the first side plate 31A and the pressing member 68M is separated from the second side plate 31B, so that the drum cartridge 6M moves down by its own weight and is supported by the drawer 5. Thereby, the photosensitive drum 15M is separated from the intermediate transfer belt 24.

In the meantime, the pressing members 67Y, 67C, 67K have the same structure as the pressing member 67M, respectively, and the pressing members 68Y, 68C, 68K have the same structure as the pressing member 68, respectively. Therefore, the descriptions of the pressing members 67Y, 67C, 67K, 68Y, 68C, 68K are omitted.

4.8 Cam

As shown in FIGS. 9 and 10, the cam 66 is coupled to the cover 3A. Thereby, the cam 66 functions in conjunction with the cover 3A. Specifically, the cam 66 is movable in the first direction between a first cam position (refer to FIG. 9) and a second cam position (refer to FIG. 10). When the cover 3A moves from the closing position toward the opening position, the cam 66 is pulled by the cover 3A and is thus moved from the first cam position toward the second cam position. Also, when the cover 3A moves from the opening position toward the closing position, the cam 66 is pressed by the cover 3A and is thus moved from the second cam position toward the first cam position.

Figure 15:
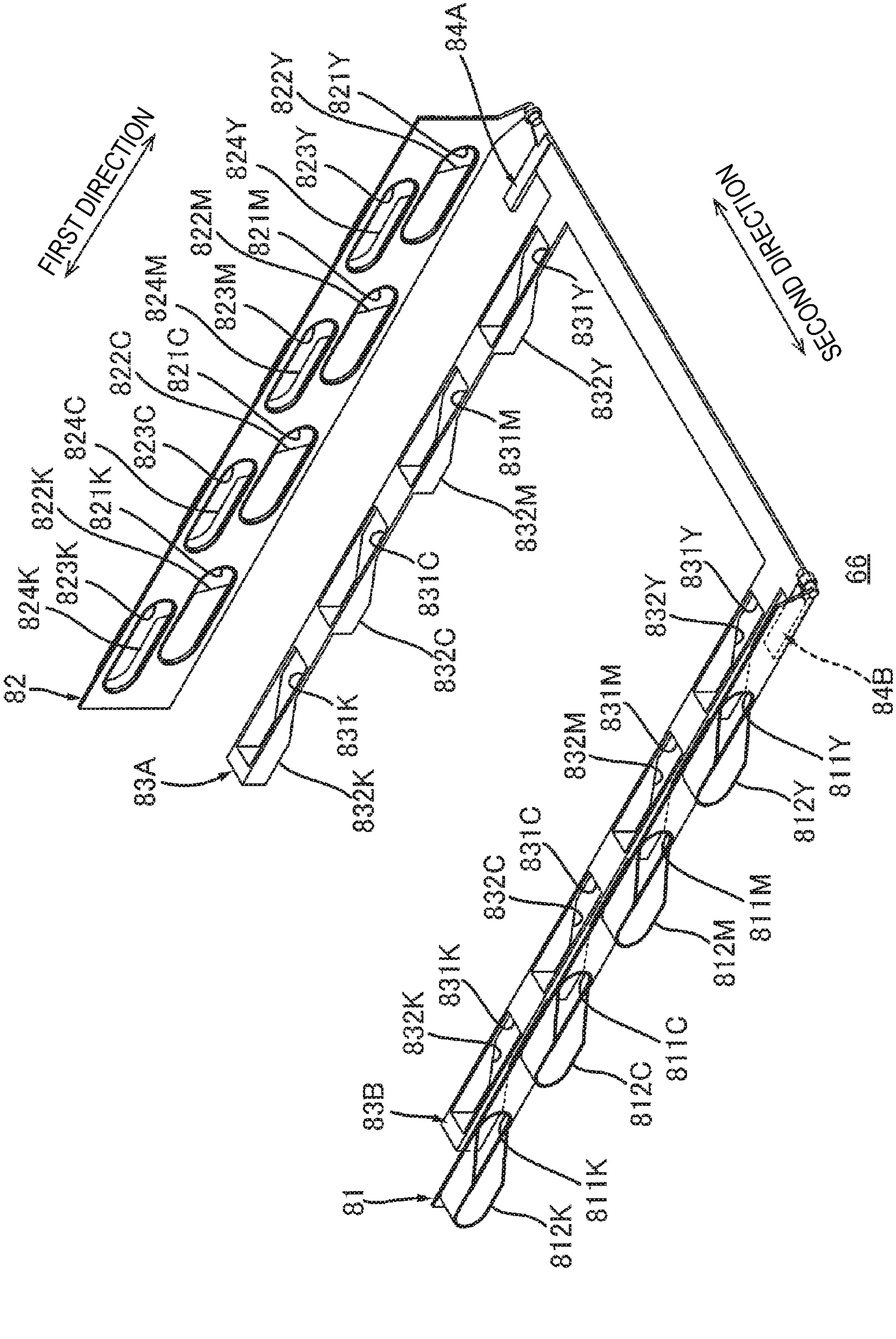
FIG. 15 is a perspective view of a cam shown in FIG. 9.

As shown in FIG. 15, the cam 66 has a first cam 81, a second cam 82, two third cams 83A, 83B, and two guides 84A, 84B. That is, the image forming apparatus 1 includes the guide 84A.

4.8.1 First Cam

As shown in FIGS. 8 and 9, the first cam 81 is located between the drawer 5 and the waste toner container 64 in the second direction. As shown in FIG. 15, the first cam 81 extends in the first direction. The first cam 81 has four through-holes 811Y, 811M, 811C, 811K, and four first pressing parts 812Y, 812M, 812C, 812K. That is, the cam 66 has the first pressing part 812M.

The four through-holes 811Y, 811M, 811C, 811K are aligned side by side in the first direction. Each of the four through-holes 811Y, 811M, 811C, 811K extends in the first direction. The waste toner conveying tube 62Y (refer to FIG. 9) passes through the through-hole 811Y. The waste toner conveying tube 62M (refer to FIG. 9) passes through the through-hole 811M. The waste toner conveying tube 62C (refer to FIG. 9) passes through the through-hole 811C. The waste toner conveying tube 62K (refer to FIG. 9) passes through the through-hole 811K.

The first pressing part 812Y is located around the through-hole 811Y. The first pressing part 812M is located around the through-hole 811M. The first pressing part 812C is located around the through-hole 811C. The first pressing part 812K is located around the through-hole 811K.

As shown in FIGS. 9 and 10, when the cover 3A moves from the closing position toward the opening position, the first pressing part 812M comes in contact with a projection 625M (refer to FIG. 11A) of the waste toner conveying tube 62M. The first pressing part 812M presses the projection 625M of the waste toner conveying tube 62M in a direction in which the waste toner conveying tube 62M moves from the first connection position toward the first disconnection position. That is, when the cover 3A moves from the closing position toward the opening position, the first pressing part 812M presses the waste toner conveying tube 62M from the first connection position toward the first disconnection position. The waste toner conveying tube 62M is pressed by the first pressing part 812M and is thus moved from the first connection position toward the first disconnection position. Thereby, when the cover 3A moves from the closing position toward the opening position, the waste toner conveying tube 62M moves from the first connection position toward the first disconnection position in conjunction with the movement of the cover 3A.

In the meantime, the first pressing parts 812Y, 812C, 812K have the same structure as the first pressing part 812M, respectively, and operate in the same manner as the first pressing part 812M. That is, when the cover 3A moves from the closing position toward the opening position, the first pressing part 812Y presses the waste toner conveying tube 62Y from the first connection position toward the first disconnection position. When the cover 3A moves from the closing position toward the opening position, the first pressing part 812C presses the waste toner conveying tube 62C from the first connection position toward the first disconnection position. When the cover 3A moves from the closing position toward the opening position, the first pressing part 812K presses the waste toner conveying tube 62K from the first connection position toward the first disconnection position.

4.8.2 Second Cam

As shown in FIGS. 8 and 9, the second cam 82 is located between the drawer 5 and the four second tubes 702Y, 702M, 702C, 702K in the second direction. As shown in FIG. 15, the second cam 82 extends in the first direction. The second cam 82 has four through-holes 821Y, 821M, 821C, 821K, four second pressing parts 822Y, 822M, 822C, 822K, four through-holes 823Y, 823M, 823C, 823K, and four third pressing parts 824Y, 824M, 824C, 824K. That is, the cam 66 has the second pressing part 822M.

The four through-holes 821Y, 821M, 821C, 821K are aligned side by side in the first direction. Each of the four through-holes 821Y, 821M, 821C, 821K extends in the first direction. The toner conveying tube 65Y (refer to FIG. 9) passes through the through-hole 821Y. The toner conveying tube 65M (refer to FIG. 9) passes through the through-hole 821M. The toner conveying tube 65C (refer to FIG. 9) passes through the through-hole 821C. The toner conveying tube 65K (refer to FIG. 9) passes through the through-hole 821K.

The second pressing part 822Y is located around the through-hole 821Y. The second pressing part 822M is located around the through-hole 821M. The second pressing part 822C is located around the through-hole 821C. The second pressing part 822K is located around the through-hole 821K.

As shown in FIGS. 9 and 10, when the cover 3A moves from the closing position toward the opening position, the second pressing part 822M comes in contact with the projection 654M (refer to FIG. 13) of the toner conveying tube 65M. The second pressing part 822M presses the projection 654M of the toner conveying tube 65M in a direction in which the toner conveying tube 65M moves from the second connection position toward the second disconnection position. That is, when the cover 3A moves from the closing position toward the opening position, the second pressing part 822M presses the toner conveying tube 65M from the second connection position toward the second disconnection position. The toner conveying tube 65M is pressed by the second pressing part 822M and is thus moved from the second connection position toward the second disconnection position. Thereby, when the cover 3A moves from the closing position toward the opening position, the toner conveying tube 65M moves from the second connection position toward the second disconnection position in conjunction with the movement of the cover 3A.

In the meantime, the second pressing parts 822Y, 822C, 822K have the same structure as the second pressing part 822M, respectively, and operate in the same manner as the second pressing part 822M. That is, when the cover 3A moves from the closing position toward the opening position, the second pressing part 822Y presses the toner conveying tube 65Y from the second connection position toward the second disconnection position. When the cover 3A moves from the closing position toward the opening position, the second pressing part 822C presses the toner conveying tube 65C from the second connection position toward the second disconnection position. When the cover 3A moves from the closing position toward the opening position, the second pressing part 822K presses the toner conveying tube 65K from the second connection position toward the second disconnection position.

As shown in FIG. 15, the four through-holes 823Y, 823M, 823C, 823K are aligned side by side in the first direction. Each of the four through-holes 823Y, 823M, 823C, 823K extends in the first direction. The main body coupling 61Y (refer to FIG. 9) passes through the through-hole 823Y. The main body coupling 61M (refer to FIG. 9) passes through the through-hole 823M. The main body coupling 61C (refer to FIG. 9) passes through the through-hole 823C. The main body coupling 61K (refer to FIG. 9) passes through the through-hole 823K.

The third pressing part 824Y is located around the through-hole 823Y. The third pressing part 824M is located around the through-hole 823M. The third pressing part 824C is located around the through-hole 823C. The third pressing part 824K is located around the through-hole 823K.

As shown in FIGS. 9 and 10, when the cover 3A moves from the closing position toward the opening position, the third pressing part 824M comes in contact with the main body coupling 61M. The third pressing part 824M presses the main body coupling 61M from the main body coupling connecting position toward the main body coupling disconnecting position. The main body coupling 61M is pressed by the third pressing part 824M and is thus moved from the main body coupling connecting position toward the main body coupling disconnecting position. Thereby, when the cover 3A moves from the closing position toward the opening position, the main body coupling 61M moves from the main body coupling connecting position toward the main body coupling disconnecting position in conjunction with the movement of the cover 3A.

In the meantime, the third pressing part 824Y, 824C, 824K have the same structure as the third pressing part 824M, respectively, and operate in the same manner as the third pressing part 824M. That is, when the cover 3A moves from the closing position toward the opening position, the third pressing part 824Y presses the main body coupling 61Y from the main body coupling connecting position toward the main body coupling disconnecting position. When the cover 3A moves from the closing position toward the opening position, the third pressing part 824C presses the main body coupling 61C from the main body coupling connecting position toward the main body coupling disconnecting position. When the cover 3A moves from the closing position toward the opening position, the third pressing part 824K presses the main body coupling 61K from the main body coupling connecting position toward the main body coupling disconnecting position.

4.8.3 Third Cam

As shown in FIG. 8, the two third cams 83A, 83B are located below the drawer 5 when the drawer 5 is located at the inner position. Specifically, the third cam 83A is located below the first side plate 31A when the drum cartridge 6M is attached to the drawer 5 and the drawer 5 is located at the inner position. Also, the third cam 83B is located below the second side plate 31B when the drum cartridge 6M is attached to the drawer 5 and the drawer 5 is located at the inner position.

As shown in FIG. 15, the third cam 83A extends in the first direction. The third cam 83A has four through-holes 831Y, 831M, 831C, 831K, and four fourth pressing parts 832Y, 832M, 832C, 832K.

The four through-holes 831Y, 831M, 831C, 831K are aligned side by side in the first direction. Each of the four through-holes 831Y, 831M, 831C, 831K extends in the first direction. The pressing member 67Y (refer to FIG. 9) passes through the through-hole 831Y. The pressing member 67M (refer to FIG. 9) passes through the through-hole 831M. The pressing member 67C (refer to FIG. 9) passes through the through-hole 831C. The pressing member 67K (refer to FIG. 9) passes through the through-hole 831K.

The fourth pressing part 832Y is located around the through-hole 831Y. The fourth pressing part 832M is located around the through-hole 831M. The fourth pressing part 832C is located around the through-hole 831C. The fourth pressing part 832K is located around the through-hole 831K.

As shown in FIGS. 8 and 14, when the cover 3A moves from the closing position toward the opening position, the fourth pressing part 832M comes in contact with the pressing member 67M. The fourth pressing part 832M presses the pressing member 67M from the first pressing position toward the first pressing-release position. The pressing member 67M is pressed by the fourth pressing part 832M and is thus moved from the first pressing position toward the first pressing-release position. Thereby, when the cover 3A moves from the closing position toward the opening position, the pressing member 67M is moved from the first pressing position toward the first pressing-release position in conjunction with the movement of the cover 3A.

In the meantime, the fourth pressing parts 832Y, 832C, 832K have the same structure as the fourth pressing part 832M, respectively, and operate in the same manner as the fourth pressing part 832M. That is, when the cover 3A moves from the closing position toward the opening position, the fourth pressing part 832Y presses the pressing member 67Y from the first pressing position toward the first pressing-release position. When the cover 3A moves from the closing position toward the opening position, the fourth pressing part 832C presses the pressing member 67C from the first pressing position toward the first pressing-release position. When the cover 3A moves from the closing position toward the opening position, the fourth pressing part 832K presses the pressing member 67K from the first pressing position toward the first pressing-release position. That is, when the cover 3A moves from the closing position toward the opening position, the third cam 83A presses each of the four pressing members 67K, 67M, 67C, 67K from the first pressing position toward the first pressing-release position.

As shown in FIG. 15, the third cam 83B is located distant from the third cam 83A in the second direction. The third cam 83B has the same structure as the third cam 83A. When the cover 3A moves from the closing position toward the opening position, the third cam 83B presses each of the four pressing members 68K, 68M, 68C, 68K from the second pressing position toward the second pressing-release position.

4.8.4 Guide

As shown in FIG. 15, the guide 84A is located between the second cam 82 and the third cam 83A in the second direction. The guide 84A extends in the first direction. The guide 84A has a plate shape.

The guide 84A is movable between an accommodation position (refer to FIG. 2) and a protruding position (refer to FIG. 3) through the opening 2A. When the guide 84A is located at the accommodation position, the guide 84A is accommodated in the main body housing 2. When the guide 84A is located at the protruding position, the guide 84A protrudes to an outside of the main body housing 2. As shown in FIG. 9, the guide 84A is located at the accommodation position when the cam 66 is located at the first cam position. As shown in FIG. 10, the guide 84A is located at the protruding position when the cam 66 is located at the second cam position. That is, when the cover 3A moves from the closing position toward the opening position, the cam 66 moves from the first cam position toward the second cam position in conjunction with the movement of the cover 3A, so that the guide 84A moves from the accommodation position toward the protruding position. That is, when the cover 3A moves from the closing position toward the opening position, the guide 84A moves from the accommodation position toward the protruding position in conjunction with the movement of the cover 3A. As shown in FIG. 3, the guide 84A guides movement of the drawer 5 when it is located at the protruding position.

The guide 84B is located between the first cam 81 and the third cam 83B in the second direction. The guide 84B is located distant from the guide 84A in the second direction. The guide 84B has the same structure as the guide 84A.

4.9 Circuit Board

As shown in FIG. 8, the circuit board 69A and the circuit board 69B are configured to control operations of the image forming apparatus 1. The circuit board 69A and the circuit board 69B are located at an opposite side to the main body coupling 61M with respect to the drum cartridge 6M in the second direction. The circuit board 69B is located with being spaced from the circuit board 69A in the vertical direction. The waste toner conveying tube 62M is located between the circuit board 69A and the circuit board 69B in the vertical direction. In other words, the circuit board 69B is located with being spaced from the circuit board in the third direction intersecting with both the first direction and the second direction. The waste toner conveying tube 62M is located between the circuit board 69A and the circuit board 69B in the third direction.

5. Operational Effects (1) As shown in FIG. 8, in the image forming apparatus 1, the waste toner can be conveyed from the drum cartridge 6M to the waste toner container 64 through the waste toner conveying tube 62M.

As shown in FIG. 10, when the user moves the cover 3A from the closing position to the opening position, the waste toner conveying tube 62M and the drum cartridge 6M are disconnected, and the drawer 5 is enabled to move between the inner position and the outer position, as shown in FIG. 3.

For this reason, the image forming apparatus 1 enables to convey the waste toner from the drum cartridge 6M to the waste toner container 64 while the drawer 5 is enabled to move between the inner position and the outer position.

(2) Also, as shown in FIGS. 8 and 14, the waste toner discharge opening 622M of the waste toner conveying tube 62M is located inside the waste toner container 64 both in the case where the waste toner conveying tube 62M is located at the first connection position (refer to FIG. 8) and in the case where the waste toner conveying tube 62M is located at the first disconnection position (refer to FIG. 10).

Thereby, when the waste toner conveying tube 62M moves, the toner discharged from the waste toner discharge opening 622M enables to be suppressed from being leaked to the outside of the waste toner container 64.

(3) Also, as shown in FIG. 5A, the drum cartridge 6M includes the first drum coupling 32 and the second drum coupling 34D.

The first drum coupling 32 is coupled to the main body coupling 61M when the drum cartridge 6M is attached to the drawer 5 and the drawer 5 is located at the inner position (refer to FIG. 8). The second drum coupling 34D is coupled to the conveying tube coupling 624M (refer to FIG. 11) of the waste toner conveying tube 62M when the drum cartridge 6M is attached to the drawer 5, the drawer 5 is located at the inner position and the waste toner conveying tube 62M is located at the first connection position. The second drum coupling 34D enables to be rotated by the power from the first drum coupling 32.

Thereby, the power input from the main body coupling 61M to the first drum coupling 32 is transmitted to the conveying tube coupling 624M of the waste toner conveying tube 62M through the second drum coupling 34D.

As a result, it is possible to operate the waste toner conveying tube 62M by using the power input from the image forming apparatus 1 to the drum cartridge 6M.

Figure 7B:
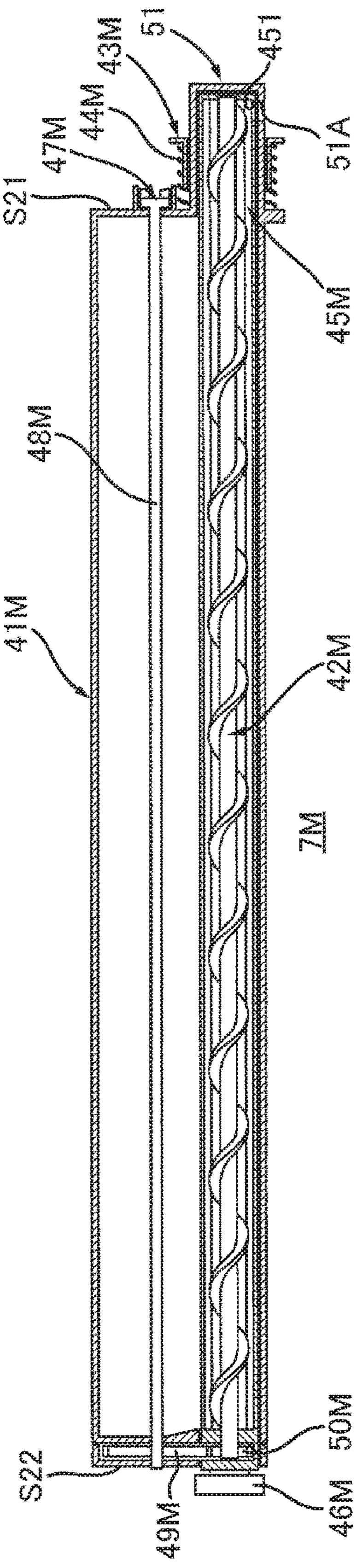
FIG. 7B depicts a state where the first shutter of the toner container shown in FIG. 7A is located at a first opening position and the second shutter is located at a second opening position.

(4) Also, as shown in FIGS. 7A and 7B, the toner container 7M includes the first shutter 43M located on the outer surface S21 of the housing 41M and the second shutter 45M located inside the housing 41M.

Thereby, the toner discharge opening 51A is not opened if the first shutter 43M is located at the first opening position and the second shutter 45M is not located at the second opening position.

For this reason, it is possible to suppress a situation where the toner discharge opening 51A is unintentionally opened and the toner is leaked.

(5) Also, as shown in FIGS. 9 and 10, the image forming apparatus 1 includes the cam 66 that functions in conjunction with the movement of the cover 3A. When the cover 3A moves from the closing position toward the opening position, the cam 66 presses the waste toner conveying tube 62M from the first connection position toward the first disconnection position by the first pressing part 812M and also presses the toner conveying tube 65M from the second connection position toward the second disconnection position by the second pressing part 822M.

Thereby, one operation of the user of moving the cover 3A from the closing position to the opening position enables to detach both the waste toner conveying tube 62M and the toner conveying tube 65M from the drum cartridge 6M.

What is claimed is:

1. An image forming apparatus comprising:
a main body housing having an opening;
a cover movable between an opening position at which the opening is opened and a closing position at which the opening is closed;
a drawer movable in a first direction through the opening between an inner position at which the drawer is located inside the main body housing and an outer position at which the drawer is located outside the main body housing, in a state where the cover is located at the opening position;
a drum cartridge attachable to and detachable from the drawer, the drum cartridge including a photosensitive drum and a drum cleaner cleaning a peripheral surface of the photosensitive drum;
a toner container for accommodating toner supplied to the drum cartridge;
a toner conveying tube for conveying toner from the toner container to the drum cartridge;
a waste toner container for accommodating waste toner removed from the peripheral surface of the photosensitive drum by the drum cleaner; and
a waste toner conveying tube for conveying the waste toner from the drum cartridge to the waste toner container,
wherein, in a state where the drawer is at the outer position, the toner conveying tube and the waste toner conveying tube are located inside the main body housing,
wherein, in a state where the drawer to which the drum cartridge is attached is located at the inner position and the cover is at the closing position, the drum cartridge and the toner conveying tube are connected each other, and
wherein, in a state where the drawer to which the drum cartridge is attached is located at the outer position, the drum cartridge and the toner conveying tube are disconnected.

2. The image forming apparatus according to claim 1,
wherein the toner conveying tube is placed on one side of the drawer in a second direction intersecting with the first direction, and the waste toner conveying tube is placed on other side of the drawer in the second direction.

3. The image forming apparatus according to claim 2,
wherein the second direction is a direction in which an axis of the photosensitive drum extends.

4. The image forming apparatus according to claim 2,
wherein the waste toner container is placed on the other side of the drawer in the second direction.

5. The image forming apparatus according to claim 1,
wherein the drum cartridge comprises:
a first through-hole through which toner passes;
a second through-hole through which waste toner passes;
a toner shutter movable in a second direction intersecting with the first direction between a closing position at which the first through-hole through is closed and an opening position at which the first through-hole through is opened; and
a waste toner shutter movable in the second direction between a closing position at which the second through-hole through is closed and an opening position at which the second through-hole through is opened,
wherein, in the state where the drawer to which the drum cartridge is attached is located at the outer position, the toner shutter and the waste toner shutter are each located at the closing position, and
wherein, in the state where the drawer to which the drum cartridge is attached is located at the inner position and the cover is at the closing position, the toner shutter and the waste toner shutter are each located at the opening position.

6. The image forming apparatus according to claim 1, wherein the waste toner conveying tube comprises:

a waste toner discharge opening discharging waste toner; and a shutter movable in a second direction intersecting with a first direction between a closing position at which the waste toner discharge opening is closed and an opening position at which the waste toner discharge opening is opened, wherein, when the waste toner container is being attached to the image forming apparatus, the shutter is moved from the closing position toward the opening position in a state where the shutter is in contact with the waste toner container, and wherein, when the waste toner container is being detached from the image forming apparatus, the shutter is moved from the opening position toward the closing position in the state where the shutter is in contact with the waste toner container.

7. The image forming apparatus according to claim 1, wherein the toner container comprises:

a housing that accommodates toner and has a toner discharge opening through which the toner is discharged;

a first shutter locating on an outer surface of the housing, the first shutter movable between a first closing position at which the toner discharge opening is closed and a first opening position at which the toner discharge opening is opened; and a second shutter located inside the housing, the second shutter rotatable about an axis extending in the second direction between a second closing position at which the toner discharge opening is closed and a second opening position at which the toner discharge opening is opened.

8. The image forming apparatus according to claim 7, wherein the toner container is attachable to and detachable from the image forming apparatus along the second direction.

9. The image forming apparatus according to claim 1, further comprising:

a second drum cartridge attachable to and detachable from the drawer, the second drum cartridge including a second photosensitive drum and a second drum cleaner cleaning a peripheral surface of the second photosensitive drum, the second drum cartridge being arranged in alignment with the drum cartridge in the first direction in a state where the drum cartridge and the second drum cartridge are mounted to the drawer; and a second waste toner conveying tube through which waste toner is conveyed from the second drum cartridge to the waste toner container, wherein, in a state where the waste toner container is attached to the image forming apparatus, the waste tonner conveying tube and the second waste tonner conveying tube are connected to the waste toner container.

10. The image forming apparatus according to claim 1, further comprising:

a guide that guides a movement of the drawer and enables to move through the opening between an accommodation position at which the guide is accommodated inside the main body housing and a protruding position at which the guide protrudes to an outside of the main body housing, wherein the guide is moved from the accommodation position toward the protruding position in conjunction with a movement of the cover in a case where the cover is moved from the closing position toward the opening position.

11. The image forming apparatus according to claim 1, wherein, in a state where the cover is at the closing position, the drum cartridge and the toner conveying tube are connected each other, and wherein, in a state where the cover is at the opening position, the drum cartridge and the toner conveying tube are disconnected.

12. An image forming apparatus comprising:

a main body housing having an opening;

a drawer movable in a first direction through the opening between an inner position at which the drawer is located inside the main body housing and an outer position at which the drawer is located outside the main body housing;

a drum cartridge attachable to and detachable from the drawer, the drum cartridge including a photosensitive drum and a drum cleaner cleaning a peripheral surface of the photosensitive drum;

a toner container for accommodating toner supplied to the drum cartridge;

a toner conveying tube for conveying toner from the toner container to the drum cartridge;

a waste toner container for accommodating waste toner removed from the peripheral surface of the photosensitive drum by the drum cleaner; and a waste toner conveying tube for conveying the waste toner from the drum cartridge to the waste toner container, wherein, in a state where the drawer is at the outer position, the toner conveying tube and the waste toner conveying tube are located inside the main body housing.

* * * * *